US011966174B2

(12) United States Patent
Koyanagi et al.

(10) Patent No.: US 11,966,174 B2
(45) Date of Patent: Apr. 23, 2024

(54) ELECTROPHOTOGRAPHIC MEMBER, ELECTROPHOTOGRAPHIC PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Takashi Koyanagi, Shizuoka (JP); Takuho Sato, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/318,217

(22) Filed: May 16, 2023

(65) Prior Publication Data

US 2023/0384710 A1 Nov. 30, 2023

(30) Foreign Application Priority Data

May 24, 2022 (JP) ................................ 2022-084553
May 10, 2023 (JP) ................................ 2023-077930

(51) Int. Cl.
*G03G 15/08* (2006.01)
*G03G 21/18* (2006.01)

(52) U.S. Cl.
CPC ..... *G03G 15/0818* (2013.01); *G03G 21/1814* (2013.01); *G03G 15/0808* (2013.01)

(58) Field of Classification Search
CPC .......... G03G 15/0808; G03G 15/0818; G03G 21/1814
USPC .......................................................... 399/286
See application file for complete search history.

(56) References Cited

U.S. PATENT DOCUMENTS

| | | | |
|---|---|---|---|
| 8,655,222 | B2 | 2/2014 | Nakamura |
| 8,768,226 | B2 | 7/2014 | Koyanagi |
| 8,798,508 | B2 | 8/2014 | Yamada |
| 9,625,854 | B2 | 4/2017 | Koyanagi |
| 9,977,359 | B2 | 5/2018 | Koyanagi |
| 10,197,930 | B2 | 2/2019 | Yamada |
| 10,331,054 | B2 | 6/2019 | Urushihara |
| 10,831,125 | B2 | 11/2020 | Ito |
| 11,156,935 | B2 | 10/2021 | Koyanagi |
| 2007/0177909 | A1 | 8/2007 | Takagi |

(Continued)

FOREIGN PATENT DOCUMENTS

| | | | |
|---|---|---|---|
| EP | 2 894 518 | A1 | 7/2015 |
| EP | 3 026 495 | A1 | 6/2016 |

(Continued)

*Primary Examiner* — Hoang X Ngo
(74) *Attorney, Agent, or Firm* — VENABLE LLP

(57) ABSTRACT

An electrophotographic member including an electro-conductive substrate, an elastic layer, and a surface layer, the surface layer containing a fine particle and a binder resin, and having a thickness of less than 1.0 μm, the fine particles having an average particle diameter of from 0.1 μm to 0.9 μm, the fine particles having a volume occupancy of 60 vol % to 99 vol % with respect to 100 vol % of the binder resin in the surface layer, the elastic modulus E1 of the fine particle being 1,000 MPa or more, and the elastic modulus E2 of the binder resin being 2 MPa to 200 MPa, and MD-1 hardness H1 of the surface layer being 50° to 100°, and a difference (H1−H2) between the H1 and MD-1 hardness H2 of the elastic layer being 5° or more.

5 Claims, 3 Drawing Sheets

(56) References Cited

U.S. PATENT DOCUMENTS

| | | | | |
|---|---|---|---|---|
| 2020/0310282 | A1* | 10/2020 | Sugiyama .......... | G03G 15/0818 |
| 2022/0100145 | A1* | 3/2022 | Kawaguchi ........ | G03G 21/1814 |
| 2022/0107582 | A1* | 4/2022 | Maezawa ........... | G03G 15/0808 |
| 2022/0155700 | A1 | 5/2022 | Seino | |
| 2022/0236663 | A1 | 7/2022 | Uesugi | |

FOREIGN PATENT DOCUMENTS

| | | | |
|---|---|---|---|
| EP | 3 974 908 | A1 | 3/2022 |
| JP | 2002-3511 | A | 1/2002 |
| JP | 2004-301872 | A | 10/2004 |
| JP | 2010-32692 | A | 2/2010 |
| JP | 2012-215647 | A | 11/2012 |
| JP | 2019-95656 | A | 6/2019 |
| WO | 2021/079917 | A1 | 4/2021 |

* cited by examiner

ELECTROPHOTOGRAPHIC MEMBER, ELECTROPHOTOGRAPHIC PROCESS CARTRIDGE, AND ELECTROPHOTOGRAPHIC IMAGE FORMING APPARATUS

BACKGROUND

Technical Field

The present disclosure relates to an electrophotographic member to be incorporated into an apparatus adopting an electrophotographic system. The present disclosure also relates to an electrophotographic process cartridge and an electrophotographic image forming apparatus each using the electrophotographic member.

Description of the Related Art

A developing method including using magnetic one-component or nonmagnetic one-component toner has been known as an image forming method for an electrophotographic image forming apparatus (also referred to as "electrophotographic apparatus"), such as a copying machine, a facsimile, or a printer. Specifically, image formation is performed through such steps as described below:

(1) a charging step of charging an electrophotographic photosensitive member that is a rotatable electrostatic latent image-bearing member with a charging unit such as a charging roller;

(2) a forming step of exposing the surface of the charged photosensitive member to laser light to form an electrostatic latent image;

(3) a developing step of applying toner in a toner container onto a developing member with a toner-supplying member, followed by the regulation of the applied toner with a toner-regulating member to form a toner layer, and the development of the electrostatic latent image with the toner in a portion where the photosensitive member and the developing member are brought into contact with each other;

(4) a fixing step of transferring the toner image on the photosensitive member onto recording sheet in a transfer portion through or without through an intermediate transfer belt, followed by the fixation of the toner image to the recording sheet with heat and a pressure in a fixing device; and (5) a cleaning step of removing the toner remaining on the photosensitive member with a cleaning blade after the transfer onto the recording sheet.

Specifically, for example, the following members have been adopted as electrophotographic members to be used in the above-mentioned developing step:

(a) a toner-supplying roller, which is present in the toner container, supplies the toner to the developing member, and peels off the post-development toner on the developing member;

(b) a toner-regulating blade that forms the toner layer on the developing member to make the amount of the toner on the developing member constant; and (c) a developing roller arranged to close the opening of the toner container storing the toner and to be partially exposed to the outside of the container so that the exposed portion may face the photosensitive member, the developing roller serving as the developing member for developing the electrostatic latent image on the photosensitive member with the toner.

Of those electrophotographic members, the roller members rotate, and the supply and regulation of the toner, and the development of the electrostatic latent image with the toner are performed by rubbing between the rollers or between the blade and each of the rollers.

In recent years, from the viewpoint of environmental consideration, the development of toner aimed at fixation at lower temperatures for reducing energy in the fixing step has been accelerating. Meanwhile, in the developing step, rubbing between the members has been occurring for uniform toner conveyance or the like, and a stress has been applied to the toner along with the occurrence. To develop the latent image with the toner that can be fixed at low temperatures, a further reduction in stress to the toner is required. In addition, various technologies have been investigated for preventing the flawing of the electrophotographic members themselves with the toner.

In Japanese Patent Application Laid-Open No. 2004-301872, there is a disclosure of a developing roller for an electrophotographic apparatus obtained by arranging a surface layer on the surface of an elastic substrate layer having elasticity, the surface layer being formed of a resin composition obtained by blending a fluorine-containing olefin resin, an acrylic resin, and inorganic fine particles. In the tensile test of JIS K 7113, the No. 2 test piece of the resin composition has an elongation percentage of 100% or more and is free of any yield point, and a stress at an elongation percentage of 100% is 25 MPa or less. In addition, there is a description that the surface layer is excellent in toner conveyability, flexibility, and followability, and hence the surface layer is hardly flawed even when used for a long time period.

SUMMARY

At least one aspect of the present disclosure is directed to providing an electrophotographic member that can be used as a developing member, which alleviates a stress to be applied to toner, can prevent the occurrence of an image defect resulting from the melt adhesion of the toner, and is excellent in durability. In addition, at least one aspect of the present disclosure is directed to providing an electrophotographic process cartridge conducive to stable formation of a high-quality electrophotographic image. Further, at least one aspect of the present disclosure is directed to providing an electrophotographic image forming apparatus that can stably form a high-quality electrophotographic image.

According to at least one aspect of the present disclosure, there is provided an electrophotographic member including: an electro-conductive substrate; an elastic layer on the substrate; and a surface layer on the elastic layer, the surface layer containing a fine particle and a binder resin, the surface layer having a thickness of less than 1.0 μm, the fine particle having an average particle diameter of from 0.1 μm to 0.9 μm, the fine particle having a volume occupancy of 60 vol % to 99 vol % with respect to 100 vol % of the binder resin in the surface layer, wherein E1 and E2 satisfy relationships represented by the following formulae (1) and (2):

$$E1 \geq 1{,}000\ \text{MPa} \quad (1)$$

$$200\ \text{MPa} \geq E2 \geq 2\ \text{MPa} \quad (2)$$

where E1 denotes an elastic modulus of the fine particle and E2 denotes an elastic modulus of the binder resin, E1 and E2 being obtained by measurement of force curves with a SPM in a cross-section of a thickness-direction of the surface layer, and wherein H1 and H2 satisfy relationships represented by the following formulae (3) and (4):

$$100° \geq H1 \geq 50° \quad (3)$$

$$H1-H2 \geq 5° \quad (4)$$

where H1 denotes an MD-1 hardness, which is measured by bringing a type C indenter into contact with a surface of the surface layer, the surface being opposite to a surface facing the elastic layer, at an indentation depth of 2 mm, and H2 denotes an MD-1 hardness, which is measured by peeling the surface layer from the electrophotographic member to expose a surface of the elastic layer, and bringing the type C indenter into contact with the exposed surface of the elastic layer at an indentation depth of 2 mm.

In addition, according to at least one aspect of the present disclosure, there is provided an electrophotographic process cartridge removably mountable to a main body of an electrophotographic image forming apparatus, the electrophotographic process cartridge including the above-mentioned electrophotographic member.

Further, according to at least one aspect of the present disclosure, there is provided an electrophotographic image forming apparatus including: an image-bearing member for bearing an electrostatic latent image; a charging device for primarily charging the image-bearing member; an exposing device for forming an electrostatic latent image on the image-bearing member that is primarily charged; a developing member for developing the electrostatic latent image with toner to form a toner image; and a transferring device for transferring the toner image onto a transfer member, wherein the developing member is the above-mentioned electrophotographic member.

Further features of the present disclosure will become apparent from the following description of exemplary embodiments with reference to the attached drawings.

DESCRIPTION OF THE EMBODIMENTS

Figure 1A:
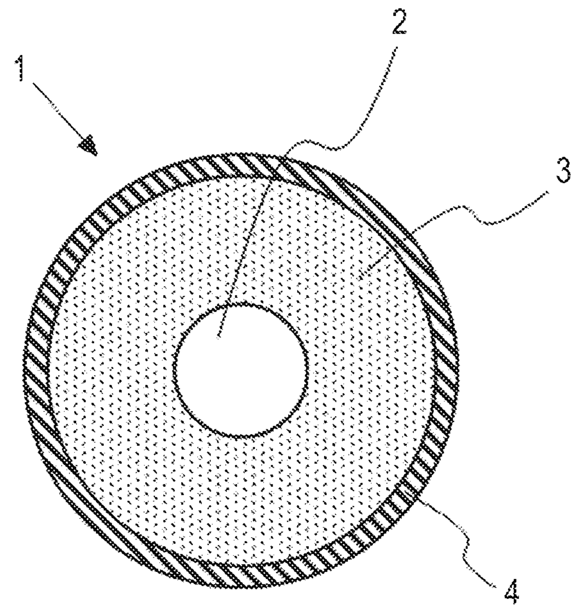
FIG. 1A is a schematic view for illustrating a transverse section of a developing roller according to one aspect of the present disclosure.

To stably form a high-quality electrophotographic image with toner that is further reduced in fixation temperature, further alleviation of a stress applied by the developing member in the developing step to the toner may be effective. In addition, the prevention of the melt adhesion of the toner to the toner-regulating member brought into abutment with the developing member may be effective.

Here, the inventors have mounted the electrophotographic member described in Japanese Patent Application Laid-Open No. 2004-301872 as a developing roller on an electrophotographic process cartridge (hereinafter also referred to as "CRG"), and have continuously output an electrophotographic image with toner having a low fixation temperature under a high-temperature and high-humidity environment. As a result, as the number of output sheets increased, a streak-like defect occurred in the electrophotographic image. Then, the inventors have dismantled and investigated the CRG having formed thereon the electrophotographic image in which the defect occurred, and as a result, have recognized that the melt adhesion of the toner onto the toner-regulating member brought into abutment with the developing roller occurs.

The inventors have assumed a cause for the occurrence of the above-mentioned defect as the number of output sheets increased in the above-mentioned experiment including using the CRG mounted with the electrophotographic member described in Japanese Patent Application Laid-Open No. 2004-301872 serving as a developing roller to be as described below.

That is, the defect may result from the fact that in an electrophotographic apparatus including the developing member according to Japanese Patent Application Laid-Open No. 2004-301872, the melt adhesion of the toner, which had been deteriorated by long-term formation of the electrophotographic image, to the toner-regulating member (hereinafter also simply referred to as "regulating member") occurred to make the state of a toner layer formed on the surface of the developing member nonuniform.

In view of the foregoing, the inventors have made investigations for the purpose of obtaining a developing member that can uniformize the state of a toner layer on itself even when used over a long time period.

As a result, the inventors have found that an electrophotographic member having the following configuration is conducive to the achievement of the above-mentioned purpose.

An electrophotographic member according to a first aspect of the present invention is an electrophotographic member including: an electro-conductive substrate; an elastic layer formed on the substrate; and a surface layer formed on the elastic layer, wherein the surface layer contains a fine particle and a binder resin, wherein the surface layer has a thickness of less than 1.0 μm, wherein the fine particle has an average particle diameter of from 0.1 μm to 0.9 μm, wherein the fine particle has a volume occupancy of vol % or more and 99 vol % or less with respect to 100 vol % of the binder resin in the surface layer.

In a thickness-direction section of the surface layer, force curves are measured by tracing the section with the probe of a scanning probe microscope (SPM). At this time, the elastic modulus of the fine particle and the elastic modulus of the binder resin, which are elastic moduli calculated by Hertz's theory, are represented by E1 and E2, respectively. The E1 and the E2 satisfy relationships represented by the following formulae (1) and (2).

$$E1 \geq 1{,}000 \text{ MPa} \quad (1)$$

$$200 \text{ MPa} \geq E2 \geq 2 \text{ MPa} \quad (2)$$

In addition, an MD-1 hardness, which is measured by bringing a type C indenter into contact with a surface opposite to a surface on a side of the surface layer of the electrophotographic member facing the elastic layer at an indentation depth of 2 mm, is represented by H1. In addition, an MD-1 hardness, which is measured by peeling the surface layer from the electrophotographic member to expose a surface of the elastic layer, and bringing the type C indenter into contact with the exposed surface of the elastic layer at an indentation depth of 2 mm, is represented by H2. In this case, the H1 and the H2 satisfy relationships represented by the following formulae (3) and (4).

$$100° \geq H1 \geq 50° \quad (3)$$

$$H1-H2 \geq 5° \quad (4)$$

<Mechanism for Expression of Effect>

The inventors have assumed the reason why the electrophotographic member having the above-mentioned configuration enables stable formation of a satisfactory electrophotographic image to be as described below. The action mechanism of the electrophotographic member according to one aspect of the present disclosure to be described below is merely one possible assumption, and the present disclosure is not limited thereto. In addition, the following description is given by taking a developing member having a roller shape (hereinafter also referred to as "developing roller") as an example of the electrophotographic member, but the electrophotographic member according to the present disclosure is not limited to the developing roller.

The developing roller according to this aspect has a surface hardness higher than that of a developing roller having only the elastic layer because of the presence of the surface layer on the elastic layer.

The fine particle in the surface layer have an elastic modulus (E1) of 1,000 MPa or more, and hence has a high hardness out of the constituents to be incorporated into the developing roller. The fine particle is incorporated into the binder resin having an elastic modulus (E2) of 2 MPa or more and 200 MPa or less at a volume occupancy of 60 vol % or more and 99 vol % or less with respect to 100 vol % of the binder resin. In addition, the thickness of the surface layer is less than 1.0 μm.

In the developing roller according to this aspect, the surface layer having a relatively high hardness is arranged in a small thickness on the elastic layer that is relatively soft. That is, the surface layer contains the high-hardness fine particle, but has a small thickness. Accordingly, the influences of the physical properties of the elastic layer may dominate a stress to toner to a larger extent than those of the physical properties of the surface layer do. In addition, an excessive stress is hardly applied to the toner because of the presence of the soft elastic layer. That is, the toner is hardly deteriorated even by long-term formation of an electrophotographic image. Probably as a result of the foregoing, the melt adhesion of the toner to a regulating member hardly occurs.

Incidentally, even the developing roller in which the stress to be applied to the toner is alleviated may be repeatedly rubbed with the regulating member to result in the accumulation of the stress on the toner when used in the formation of an electrophotographic image over a longer time period. However, in the developing roller according to this aspect, the outer surface of the developing roller includes the high-hardness surface layer, and hence the tackiness of the surface of the developing roller is suppressed. As a result, contamination derived from the toner is hardly accumulated on the surface of the developing roller. In addition, even when the melt adhesion of the toner to the regulating member occurs, the contamination is hardly accumulated on the regulating member because the toner is satisfactorily scraped off by the high-hardness fine particle in the surface layer of the developing roller according to this aspect. Probably because of those reasons, a toner layer having a uniform thickness can be stably formed on the developing roller.

<Preferred Configuration and Physical Property Ranges of Surface Layer>

The thickness of the surface layer is less than 1.0 μm preferably 0.8 μm or less, more preferably 0.5 μm or less. It is conceivable that when the thickness is set to less than 1.0 μm, the stress to the toner can be alleviated, and hence the occurrence of filming on the surface of the developing roller due to the toner can be more satisfactorily prevented. Although the lower limit of the thickness of the surface layer is not particularly limited, the thickness is preferably such that the developing roller can more reliably hold the fine particle. Specifically, for example, the thickness is preferably 0.1 μm or more, more preferably 0.2 μm or more. The thickness of the surface layer falls within the range of preferably from 0.1 μm or more to less than 1.0 μm, particularly preferably from 0.1 μm or more to 0.8 μm or less, more preferably from 0.1 μm or more to 0.5 μm or less. The thickness of the surface layer is measured as described below. The entire thickness-direction section of the surface layer is observed with an optical microscope or an electron microscope, and the thickness of the binder resin in a portion free of any fine particles is measured. Measurement sites are a total of 9 sites determined as follows: 3 sites in the circumferential direction of the developing roller and 3 sites in a direction (axial direction) perpendicular to the circumferential direction. In addition, the average of the thicknesses at the respective measurement sites is adopted as the thickness of the surface layer.

Protrusions derived from the fine particles are formed on the surface of the developing roller. In addition, even when the fine particles are not exposed from the surface layer but embedded in the surface layer, in the case where the surface of the developing roller is pressed, the manner in which a portion containing the fine particles in the surface layer is recessed and the manner in which a portion free of any fine particles therein is recessed differ from each other by virtue of a difference in elastic modulus between the fine particles and the binder resin. It is conceivable that even when a toner melt-adhesion product adheres to the regulating member, the toner melt-adhesion product can be satisfactorily scraped off by such surface characteristic of the developing roller.

The average particle diameter of the fine particles to be incorporated into the surface layer is from 0.1 μm to 0.9 μm, preferably from 0.1 μm to 0.5 μm. In the case where the average fine particle of the fine particles is more than 0.9 μm, the stress to the toner may become higher between the regulating member and the fine particles to make filming remarkable. Meanwhile, in the case where the average particle diameter of the fine particles is less than 0.1 μm, concern is raised in that the toner that has stuck and melt-adhered to the regulating member in the latter half of the endurance of the developing roller is not appropriately scraped off. In this case, the following may occur: contamination on the regulating member grows to cause a streak in the circumferential direction of the developing roller, the streak serving as a coat thereon, and the streak becomes apparent as an image harmful effect.

In addition, the average particle diameter of the fine particles is preferably comparable to the thickness of the surface layer, and preferably falls within the range from the thickness of the surface layer plus 3 μm to the thickness minus 3 μm. In the present disclosure, the average particle diameter of the fine particles is a number-average particle diameter. Although a method of measuring the number-average particle diameter is not particularly limited, for example, when the number-average particle diameter of the fine particles is measured from the fine particles themselves as a raw material to be used in a coating material for forming the surface layer, the measurement may be performed with, for example, a fine particle size distribution measuring device. Specifically, for example, a fine particle size distribution measuring device (trade name: Coulter Counter Multisizer 3; manufactured by Beckman Coulter, Inc) by a pore electric resistance method and dedicated software (trade name: Beckman Coulter Multisizer 3 Version 3.51, manufactured by Beckman Coulter, Inc.) can be used. In the case that the above-mentioned device is employed to measure the number-average particle diameter, an aperture diameter is set to 100 μm, and measurement is performed in 25,000 effective measurement channels, and then measurement data is analyzed and calculated. As an aqueous electrolytic solution for using the measurement, a solution obtained by dissolving special grade sodium chloride in ion-exchanged water so as to attain a concentration of 1 mass %, can be employed. As such an aqueous electrolytic solution, for example, "ISOTON II" (trade name; manufactured by Beckman Coulter, Inc) is available on the market. Here, prior to the measurement and analysis, the dedicated software is preferably set as follow.

On the "screen for change of standard measurement method (SOM)" of the dedicated software, the total count number in a control mode is set to 50,000 particles, the number of measurements is set to 1, and the Kd value is set to a value obtained using (standard particle (10.0 μm), manufactured by Beckman Coulter, Inc.). A threshold value and a noise level are automatically set by pressing a threshold value/noise level measurement button. In addition, the current is set to 1,600 μA, the gain is set to 2, the electrolyte solution is set to "ISOTON II" (trade name), and the flash of the aperture tube after the measurement is checked. On the "screen for conversion setting from pulse to particle diameter" of the dedicated software, the bin interval is set to logarithmic particle diameter, the particle diameter bin is set to 256 particle diameter bins, and the particle diameter range is set to 2 to 60 μm.

At least one aspect of specific measurement methods is explained below.

(1) About 200 mL of the aqueous electrolyte solution is put in a 250-mL glass round-bottom beaker dedicated to Multisizer 3 and set on a sample stand, and stirring of a stirrer rod is performed counterclockwise at 24 rotations/second. Then, dirt and air bubbles in the aperture tube are removed by the "aperture flush" function of the analysis software.

(2) About 30 mL of the aqueous electrolyte solution is put in a 100-mL glass flat-bottom beaker. To the aqueous solution, added is about 0.3 mL of a diluent obtained by diluting "Contaminon N" (trade name; manufactured by Fuji Film-Wako Pure Chemical Industries, Ltd.) 3 times by mass with ion-exchanged water. "Contaminon N" is a 10 mass % aqueous solution of neutral detergent for washing precision measuring instrument.

(3) Into a water tank of an ultrasonic disperser (trade name: Ultrasonic Dispersion System Tetora 150, manufactured by Nikkaki Bios Co., Ltd.) with an electrical output of 120 W, incorporating 2 oscillators with an oscillation frequency of 50 kHz in a state where their phases are shifted by 180 degrees, a predetermined amount of ion-exchanged water and about 2 mL of Contaminon N (trade name) are added.

(4) The beaker in the above (2) is set in a beaker fixing hole of the ultrasonic disperser, and the ultrasonic disperser is operated. Then, a height position of the beaker is adjusted so that a resonance state of a liquid level of the aqueous electrolytic solution in the beaker is maximized.

(5) While the aqueous electrolyte solution in the beaker in the above (4) is irradiated with ultrasonic waves, about 10 mg of the toner (particle) is added little by little to the aqueous electrolyte solution and dispersed. Then, the ultrasonic dispersion treatment is continued for additional 60 seconds. In the ultrasonic dispersion, a water temperature of the water tank is appropriately adjusted to 10 to 40 degree in Celsius.

(6) The aqueous electrolyte solution in the above (5) in which the toner (particle) is dispersed is added dropwise, using a pipette, to the round bottom beaker in the above (1) placed in the sample stand, and the measurement concentration is adjusted to about 5%. Then, the measurement is performed until a number of measurement particle reaches 50,000.

(7) The measurement data is analyzed with the dedicated software attached to the device to calculate a weight average particle diameter (D4). The "average diameter" on the analysis/volume statistical value (arithmetic mean) screen when graph/volume % is set in the dedicated software is the weight average particle diameter (D4). The "average diameter" on the "analysis/number statistics (arithmetic mean)" screen when graph/number % is set in the dedicated software is a number-average particle diameter (D1). In addition, when the average particle diameter of the fine particles is measured from the surface layer, the measurement may be performed by, for example, a method as explained below.

First, in the case that the electrophotographic member is a developing roller, a sample for the measurement is cut in accordance the following method. The developing roller is cooled to −150.degree. C., and a rubber slice is cut out on which such a cross section in the thickness direction of the surface layer appears, and passes through a vertices of a protrusion on the outer surface of the developing roller with the use of a cryomicrotome (UC-6 (product name), manufactured by Leica Microsystems). Number-average particle diameter of the resin particles present in the surface layer can be measured as follows. Initially, from a cross sectional areas of the resin particles in the obtained sample, circle equivalent diameters (Ds) of the respective resin particles are calculated. Here, each of the resin particles are assumed to be spherical particles, and the cross sections are assumed to be cross sections obtained by random cutting of the spherical particles. Then, the particle diameters D of the respective resin particles are calculated from the circle equivalent diameters Ds in accordance with the Expression (1).

$$D_S = 2 \times \int_{\frac{-D}{2}}^{\frac{D}{2}} \sqrt{\left(\frac{D}{2}\right)^2 - x^2}\, dx \qquad (1)$$

$$D = 4/\pi \times D_S$$

The above calculation is performed for 100 particles in total of each of the resin particles in the sample. This calculation is carried out regarding 9 samples taken from 9 spots in total, where 3 equally spaced spots in the axial direction of the developing roller, and 3 equally spaced spots in the circumferential direction of the developing roller. Then an arithmetic average of the obtained particle diameters D of the respective samples is calculated and the obtained value is determined as a number-average particle diameter of the developing roller.

The volume occupancy of the fine particles with respect to 100 vol % of the binder resin to be incorporated into the surface layer is 60 vol % or more and 99 vol % or less. The volume occupancy is preferably 70 vol % or more and 95 vol % or less. When the volume occupancy falls within the above-mentioned ranges, the embrittlement of the surface layer due to an excessive increase in content of the fine particles with respect to the binder resin in the surface layer can be satisfactorily suppressed, and hence the shaving and flawing of the surface layer can be satisfactorily prevented. In addition, even when the sticking or melt adhesion of the toner to the regulating member described above occurs, the toner can be satisfactorily scraped off. A method of measuring the volume occupancy of the fine particles with respect to the binder resin in the surface layer is explained below.

The volume occupancy of the fine particles in the surface layer is same as the area ratio obtained from the cross-sectional area in the thickness direction of the surface layer. Thus, a ratio of the sum of areas of the fine particles observed in the cross-section of the sample prepared above, with respect to the area of the cross section of the sample is calculated. This calculation is carried out regarding the above-prepared nine samples, and an arithmetic mean value is taken as the volume occupancy of the fine particles in the surface layer.

The elastic modulus (E1) of the fine particles to be incorporated into the surface layer is 1,000 MPa or more in terms of elastic modulus calculated by Hertz's theory through the measurement of a force curve with a SPM in a thickness-direction section of the surface layer. The elastic modulus is preferably 1,500 MPa or more. When the elastic modulus is 1,000 MPa or more, a toner lump that has stuck and melt-adhered to the toner-regulating member can be more reliably scraped off.

In addition, the elastic modulus (E2) of the binder resin to be incorporated into the surface layer, which is calculated by the above-mentioned method, is 2 MPa or more and 200 MPa or less. The E2 is particularly preferably 25 MPa or more and 200 MPa or less. The surface layer according to the present disclosure contains the fine particles having an E1 of 1,000 MPa or more at a content that is as high as from 60 vol % to 99 vol % with respect to the binder resin in the surface layer despite the fact that its thickness is as small as less than 1.0 μm. In general, a resin layer containing particles having a high elastic modulus at a high content tends to be brittler as its thickness becomes smaller. However, in the resin layer according to the present disclosure, the elastic modulus E2 of the binder resin falls within the range of from 2 MPa to 200 MPa. Probably because of the foregoing, the embrittlement of the surface layer can be prevented despite the fact that a large amount of the fine particles having a high elastic modulus are loaded into the layer.

To obtain the elastic modulus E1 of the fine particles and the elastic modulus E2 of the binder resin in a thickness-direction section of the surface layer, first, force curves are measured with a SPM. The mode of the SPM for the measurement of the force curves is set to a contact mode, and the Force Distance and Trigger Point thereof are set to 500 nm and 0.01 V, respectively. In addition, a silicon cantilever for a dynamic mode such as "OMCL-AC-160TS" (product name, manufactured by Olympus Corporation, spring constant=47.08 N/m) is used as a cantilever, and its scanning frequency is set to 1 Hz.

The MD-1 hardness (H1), which is measured by bringing a type C indenter into contact with the surface opposite to the surface on the side of the surface layer of the electrophotographic member of the present disclosure facing the elastic layer at an indentation depth of 2 mm, is 50° or more and 100° or less. The hardness is preferably 70° or more and 95° or less. When the hardness is more than 100°, concern is raised about the occurrence of filming due to an increase in stress to the toner. Meanwhile, when the hardness is less than 50°, concern is raised in that the contact area of an abutting portion between the toner and the developing roller increases to cause the sticking (initial sticking) of the toner particularly after its long-term standing under a high-temperature and high-humidity environment.

The MD-1 hardness, which is measured by peeling the surface layer from the electrophotographic member of the present disclosure to expose the surface of the elastic layer, and bringing the type C indenter into contact with the exposed surface of the elastic layer at an indentation depth of 2 mm, is represented by H2. In this case, a difference (H1-H2) between the MD-1 hardnesses H1 and H2 is 5° or more. When the value is less than 5°, concern is raised about the occurrence of filming because the suppression of the tack of the electrophotographic member becomes insufficient, and hence the accumulation of toner contamination thereon is accelerated.

The 10% modulus value of the binder resin to be used in the electrophotographic member of the present disclosure is preferably 2 MPa or more and 20 MPa or less. The term "10% modulus" refers to a tensile stress when the resin is elongated by 10%. The melt adhesion of the toner to the regulating member may be remarkable particularly at the time of a reduction in frequency at which the toner on the developing roller is replaced with a new one when an electrophotographic process cartridge including the member is out of toner. At this time, a portion on the regulating member where the melt adhesion of the toner occurs has a size, and hence its penetration into the surface of the developing roller occurs. At this time, when the binder resin of the developing roller has flexibility represented by the above-mentioned characteristic, no particular flaw or peeling occurs. Meanwhile, when the 10% modulus value of the binder resin is more than 20 MPa, concern is raised about the occurrence of a flaw or peeling because the binder resin is poor in flexibility. Meanwhile, when the 10% modulus value of the binder resin is less than 2 MPa, concern is raised about toner contamination on the surface of the developing roller because a state in which the molecular mobility of the resin is high is established. Accordingly, concern is raised about the occurrence of filming.

<Configuration of Developing Roller>

Figure 1B:
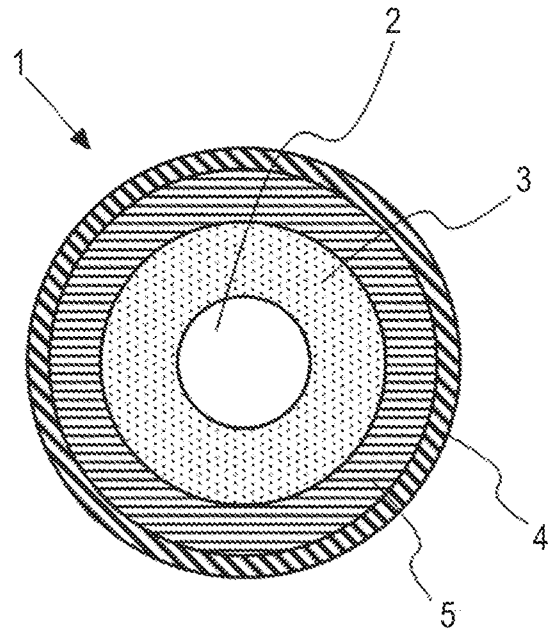
FIG. 1B is a schematic view for illustrating a transverse section of a developing roller according to one aspect of the present disclosure.

A schematic view of a transverse section in a direction perpendicular to the axial direction of the developing roller according to one aspect of the present disclosure is illustrated in each of FIG. 1A and FIG. 1B, but the shape of the developing roller is not limited thereto.

As illustrated in FIG. 1A, a developing roller 1 includes a substrate 2 having a columnar shape or a hollow cylindrical shape, and a surface layer 4, and further includes an elastic layer 3 between the substrate 2 and the surface layer 4. That is, the developing roller includes the substrate, the elastic layer on the substrate, and the surface layer on the elastic layer.

The other configuration of the developing roller 1 may be a three-layer structure in which an intermediate layer 5 is arranged between the elastic layer 3 and the surface layer 4 as illustrated in FIG. 1B, or a configuration in which the large number of intermediate layers 5 are arranged therebetween. A known intermediate layer for a developing roller may be used as the intermediate layer.

<Surface Layer>

[Fine Particle]

The fine particle according to the present disclosure satisfies the following features (I) and (II):

(I) their average particle diameter is from 0.1 μm to 0.9 μm; and (II) when the elastic modulus of the fine particle, which is an elastic modulus calculated by Hertz's theory through the measurement of a force curve with the probe of a SPM device in a thickness-direction section of the surface layer, is represented by E1, the E1 satisfies the relationship represented by the following formula (1).

$$E1 \geq 1{,}000 \text{ MPa} \quad (1)$$

The fine particle according to the present disclosure may be used without any particular limitation as long as the fine particle satisfy the above-mentioned features (I) and (II). Specifically, a fine particle of, for example, a polyurethane resin, a polyester resin, a polyether resin, a polyamide resin, an acrylic resin, a polycarbonate resin, or a phenol resin may be used as an organic filler. In addition, those particles are preferably crosslinked resin particles for satisfying the formula (1).

In addition, an insulating or electro-conductive inorganic filler may be used. Examples of the insulating inorganic filler include quartz fine powder, silica particles, diatomaceous earth, zinc oxide, basic magnesium carbonate, active calcium carbonate, magnesium silicate, aluminum silicate, titanium dioxide, talc, mica powder, aluminum sulfate, calcium sulfate, barium sulfate, and a glass fiber. The surface of each of those inorganic fillers may be hydrophobized by treatment with an organic silicon compound such as polydiorganosiloxane.

Examples of the electro-conductive inorganic filler include: carbon-based substances, such as carbon black and graphite; metals or alloys, such as aluminum, silver, gold, a tin-lead alloy, and a copper-nickel alloy; metal oxides, such as zinc oxide, titanium oxide, aluminum oxide, tin oxide, antimony oxide, indium oxide, and silver oxide; and substances obtained by subjecting various insulating fillers to electro-conductive metal plating with copper, nickel, or silver.

[Binder Resin]

The binder resin satisfies the following requirement (i):

Requirement (i): when the elastic modulus of the binder resin, which is an elastic modulus calculated by Hertz's theory through the measurement of a force curve with the probe of a SPM device in a thickness-direction section of the surface layer, is represented by E2, the E2 satisfies the relationship represented by the following formula (2).

$$200 \text{ MPa} \geq E2 \geq 2 \text{ MPa} \quad (2)$$

A resin satisfying the above-mentioned elastic characteristic may be used as the binder resin without any particular limitation. Specific examples thereof include a polyurethane resin, an acrylic resin, a polyolefin resin, an epoxy resin, a polyester resin, and a silicone resin. Those resins may be used alone or as a mixture thereof.

Of those, a polyurethane resin has moderate flexibility, and hence suitably satisfies the formula (2). Even the elastic modulus of a resin except the polyurethane resin can be adjusted within the above-mentioned elastic modulus range by a method such as the adjustment of the magnitude of a molecular weight between its crosslinking points.

The 10% modulus value of the binder resin preferably falls within the range of from 2 MPa or more to 20 MPa or less. When the 10% modulus value falls within the range, the binder resin shows a moderate elongation property, and hence can satisfactorily follow the deformation of the elastic layer. Meanwhile, when the 10% modulus value is MPa or less, the resin can follow the deformation of the elastic layer, and hence can suppress the tearing and cracking thereof. In addition, when the 10% modulus value is 2 MPa or more, the tackiness of the surface layer is suppressed from becoming remarkable, and hence the following is avoided: the contamination of the surface layer occurs to cause filming.

[Measurement of Elastic Modulus E1 and Elastic Modulus E2]

The elastic modulus E1 of the fine particle in the surface layer and the elastic modulus E2 of the binder resin therein are measured as described below. Such a sample that a section corresponding to the entire thickness of the surface layer is exposed is produced from the surface layer. Although the size of the sample is not particularly limited, the sample may be, for example, a cube shape 100 μm on a side. Then, the probe of a scanning probe microscope (SPM) is brought into contact with a fine particle portion and a binder resin portion exposed to the surface of the resultant sample to which the entire thickness-direction section of the surface layer is exposed to measure force curves. The elastic moduli E1 and E2 are determined from the resultant force curves based on Hertz's theory. For example, "MFP-3D-Origin" (product name, manufactured by Oxford Instruments) may be used as the SPM. When the device is used, the elastic moduli E1 and E2 are automatically output from the measured force curves.

Herein, a method of producing the sample from the surface layer, which is not particularly limited, is, for example, a method including using a keen razor or a microtome, or a method including using a focused ion beam (FIB).

In addition, the position at which the sample is obtained, which is not particularly limited, may be set to, for example, a center in a direction (longitudinal direction) perpendicular to the circumferential direction of the developing roller. Further, the positions at which the force curves are measured with the SPM in the surface (observation surface) of the obtained sample corresponding to the thickness-direction section of the surface layer are not particularly limited, and the measurement only needs to be performed in the fine particle portion and the binder resin portion exposed to the observation surface. However, from the viewpoint of performing more stable measurement, the measurement is preferably performed in the fine particle portion and the binder resin portion exposed to the region of the observation surface ranging from T/3 to 2T/3 in a depth direction from the outer surface side of the surface layer, that is, a central region when the observation surface is divided into three equal parts in its thickness direction.

In addition, the elastic modulus E1 in the present disclosure is a value determined as follows: force curves are measured with the SPM at 10 arbitrary sites of the fine particle portion exposed to the observation surface, and elastic moduli are calculated from the force curves; and the arithmetic average of 8 values out of the calculated elastic moduli except the maximum and the minimum is adopted as the E1.

Similarly, the elastic modulus E2 in the present disclosure is a value determined as follows: force curves are measured with the SPM at 10 arbitrary sites of the binder resin portion exposed to the observation surface, and elastic moduli are calculated from the force curves; and the arithmetic average of 8 values out of the calculated elastic moduli except the maximum and the minimum is adopted as the E2.

With regard to the measurement of the force curves, the mode of the SPM for the measurement of the force curves is set to a contact mode, and the Force Distance and Trigger Point thereof are set to 500 nm and 0.01 V, respectively. In addition, a silicon cantilever for a dynamic mode such as "OMCL-AC-160TS" (product name, manufactured by Olympus Corporation, spring constant=47.08 N/m) is used as a cantilever, and its scanning frequency is set to 1 Hz.

[Measurement of MD-1 Hardness]

The electrophotographic member serving as a measurement object is left to stand under an environment at a temperature of 23° C. and a relative humidity of 53% for 24 hours. Next, the hardness of the electrophotographic member is measured with a microrubber hardness meter (product name: MD-1capa, manufactured by Kobunshi Keiki Co., Ltd.) and a type C indenter (diameter: 1.00 mm) at each of 12 points determined as follows by indenting the member by 2 mm: the central portion of the surface layer of the electrophotographic member and positions distant inward from both the end portions thereof by 20 mm each are determined, and four points are determined in each of the three portions in increments of 90° in the circumferential direction thereof. The average of those measured values is adopted as the MD-1 hardness H1 of the surface layer.

Next, the surface layer is carefully removed from the above-mentioned electrophotographic member, and measurement is performed by the above-mentioned approach under a state in which the elastic layer is exposed. Thus, the MD-1 hardness H2 of the elastic layer is obtained. Although a method of removing the surface layer is not particularly limited, for example, a razor or a microtome may be used.

[Other Components]

In addition to the above-mentioned components, any one kind or a plurality of kinds of additives selected from modified silicone compounds or modified fluorine compounds may be incorporated into the surface layer to the extent that the function of the surface layer is not inhibited. In addition, components, such as a crosslinking agent, a plasticizer, a filler, an extender, a vulcanizing agent, a vulcanization aid, a crosslinking aid, an antioxidant, an age inhibitor, a processing aid, and a leveling agent, may be incorporated thereinto.

<Method of Producing Surface Layer>

Although a method of producing the surface layer according to this embodiment is not particularly limited, a coating molding method including using a liquid coating material is preferred. The surface layer may be formed by, for example, dispersing and mixing the respective materials for the surface layer in a solvent to prepare a coating material, applying the coating material onto the elastic roller having the elastic layer formed on the electro-conductive substrate, and drying the applied coating material to solidify the coating material or heating the coating material to cure the coating material.

When a crosslinked urethane resin is used as the binder resin, the solvent is preferably a polar solvent from the viewpoint of its compatibility with a polyol and an isocyanate compound serving as raw materials for the resin. Examples of the polar solvent include: alcohols, such as methanol, ethanol, and n-propanol; ketones, such as acetone, methyl ethyl ketone, and methyl isobutyl ketone; and esters, such as methyl acetate and ethyl acetate. Solvents that are selected from those polar solvents and are well compatible with other materials may be used alone or as a mixture thereof.

In addition, a solid content at the time of the preparation of the coating material, which may be freely adjusted by the mixing amount of the solvent, is preferably adjusted to 20 mass % or more and 40 mass % or less from the viewpoint of uniformly dispersing the fine particles. A known dispersing device utilizing beads, such as a sand mill, a paint shaker, a dinomill, or a pearl mill, may be utilized for the dispersion and the mixing. In addition, any one of dip coating, ring coating, spray coating, and roll coating may be utilized as a method for the application.

Although the temperature at which the coating material is dried to be solidified or is heated to be cured is not particularly limited as long as the crosslinking of the urethane resin advances, a temperature of 50° C. or more is preferred, and a temperature of 70° C. or more is more preferred.

<Substrate>

The substrate functions as an electrode and a supporting member for the developing member, and includes any one of such electro-conductive materials as described below: a metal or an alloy, such as aluminum, a copper alloy, or stainless steel; iron subjected to plating treatment with chromium or nickel; and a synthetic resin having conductivity. The substrate may be solid or hollow.

<Elastic Layer>

A known material for an elastic layer or a material that may be utilized for an elastic layer may be used as a material for forming the elastic layer. It is typically preferred that the elastic layer be formed from a molded body of a rubber material.

Examples of the rubber material include an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, a hydrogenated NBR, and a urethane rubber. Those rubbers may be used alone or as a mixture thereof.

Of those, a silicone rubber is particularly preferred because the rubber hardly causes a permanent compression set in the elastic layer even when any other member is brought into abutment with the layer over a long time period. Examples of the silicone rubber include cured products of addition-curable silicone rubbers. Moreover, a cured product of an addition-curable dimethyl silicone rubber is particularly preferred.

Various additives, such as a conductivity-imparting agent, a non-electro-conductive filler, a crosslinking agent, and a catalyst, are appropriately blended into the elastic layer. Fine particles of any one of the following materials may be used as the conductivity-imparting agent: carbon black; an electro-conductive metal, such as aluminum or copper; and an electro-conductive metal oxide, such as zinc oxide, tin oxide, or titanium oxide. At least one kind of those materials may be used. Of those, carbon black is particularly preferred because the carbon black can be obtained in a relatively easy manner, and provides satisfactory conductivity. When the carbon black is used as the conductivity-imparting agent, the carbon black is preferably blended in an amount of 2 parts by mass or more and 50 parts by mass or less with respect to 100 parts by mass of the rubber material in the material for forming the elastic layer.

Examples of the non-electro-conductive filler include silica, quartz powder, titanium oxide, zinc oxide, and calcium carbonate. At least one kind thereof may be used.

Examples of the crosslinking agent include di-t-butyl peroxide, 2,5-dimethyl-2,5-di(t-butylperoxy)hexane, and dicumyl peroxide. At least one kind thereof may be used.

<Developing Device>

The developing member according to each aspect of the present disclosure may be applied to a developing device using a magnetic one-component developer or a nonmagnetic one-component developer. In addition, the developing member according to each aspect of the present disclosure may be applied to a developing device out of contact with an electrophotographic photosensitive member and a developing device whose developing member is in contact with the electrophotographic photosensitive member, and a developing device using a two-component developer.

<Electrophotographic Process Cartridge>

Figure 2:
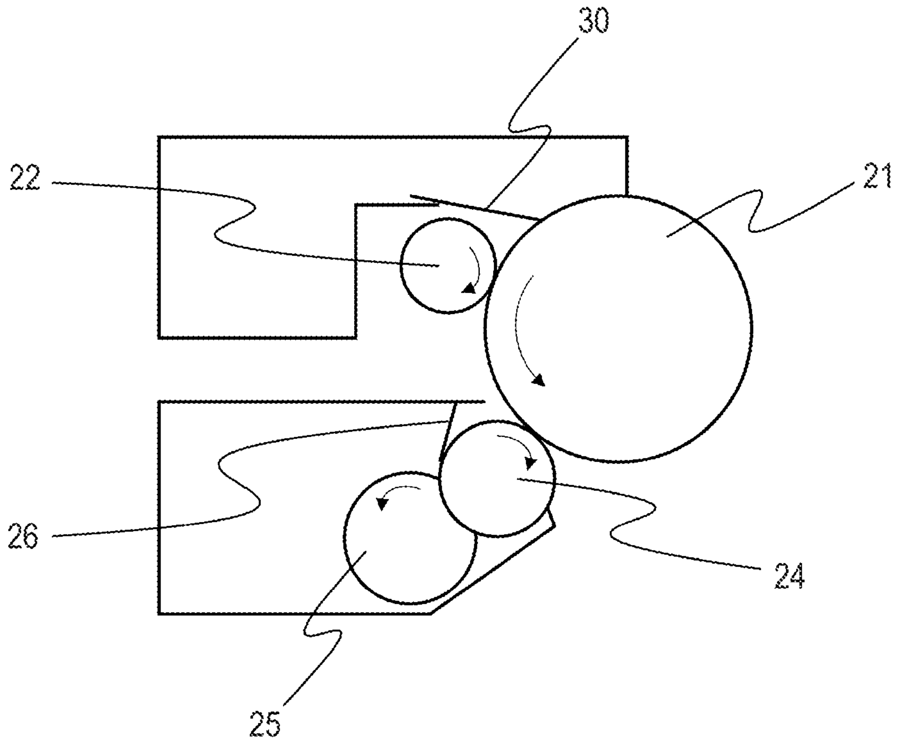
FIG. 2 is a schematic view for illustrating an electrophotographic process cartridge according to one aspect of the present disclosure.

FIG. 2 is a schematic view for illustrating an electrophotographic process cartridge according to one embodiment of the present disclosure. The electrophotographic process cartridge includes: an image-bearing member (photosensitive member) 21 such as a photosensitive drum; a charging device including a charging member (charging roller) 22; and a developing device including a developing member (developing roller) 24. In addition, the developing device has built therein a supplying roller 25, which is a toner-supplying member brought into abutment with the developing member 24, and a regulating blade 26 serving as a toner-regulating member. Further, a cleaning member (cleaning blade) 30 that removes residual toner on the image-bearing member 21 is arranged in front of the charging member 22.

<Electrophotographic Image Forming Apparatus>

Figure 3:
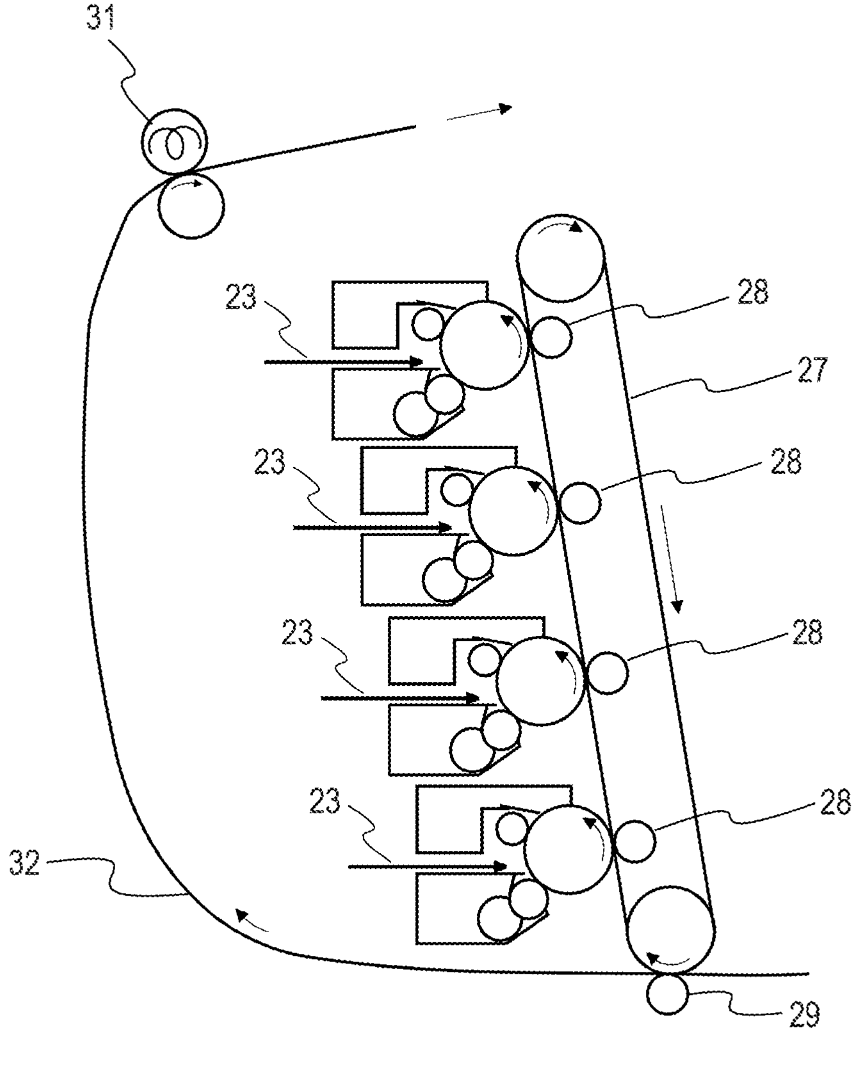
FIG. 3 is a schematic view for illustrating an electrophotographic image forming apparatus according to one aspect of the present disclosure.

FIG. 3 is a schematic view of an electrophotographic image forming apparatus mounted with the electrophotographic process cartridge of FIG. 2. In addition, the electrophotographic process cartridge is supported by a housing (not shown), and is removably mounted on the main body of the electrophotographic image forming apparatus.

The image-bearing member 21 is uniformly charged (primarily charged) by the charging member 22 connected to a bias power source (not shown). The charging potential of the image-bearing member 21 at this time is −800 V or more and −400 V or less. Next, exposure light 23 for writing an electrostatic latent image is applied from an exposing device (not shown) to the image-bearing member 21 to form the electrostatic latent image on its surface. LED light and laser light may each be used as the exposure light 23. The surface potential of the exposed portion of the image-bearing member 21 is, for example, −200 V or more and −100 V or less.

Next, toner charged to negative polarity is applied to the electrostatic latent image by the developing member 24 to form a toner image on the image-bearing member 21. Thus, the electrostatic latent image is transformed into a visible image (development). At this time, a voltage of, for example, −500 V or more and −300 V or less is applied to the developing member 24 by the bias power source (not shown). The developing member 24 is brought into contact with the image-bearing member 21 with a nip width of, for example, 0.5 mm or more and 3 mm or less therebetween. In the electrophotographic process cartridge of this embodiment, the supplying roller 25 is brought into abutment with the developing roller 24 under a rotatable state on the upstream side of the rotation of the developing roller 24 with respect to an abutting portion between the regulating blade 26 serving as a toner-regulating member and the developing roller 24.

The toner image developed on the image-bearing member 21 is primarily transferred onto an intermediate transfer belt 27 serving as a transferring unit. A primary transfer member 28 is brought into abutment with the rear surface of the intermediate transfer belt 27, and the application of a voltage of +100 V or more and +1,500 V or less to the primary transfer member 28 leads to the primary transfer of the toner image having negative polarity from the image-bearing member 21 onto the intermediate transfer belt 27. The primary transfer member 28 may be such a roller shape as illustrated in the figure, or any other shape such as a blade shape.

Further, the example of the electrophotographic image forming apparatus of FIG. 3 is a full-color image forming apparatus, and performs the above-mentioned respective steps, that is, the charging, the exposure, the development, and the primary transfer for each of a yellow color, a cyan color, a magenta color, and a black color. Accordingly, in the electrophotographic image forming apparatus illustrated in FIG. 3, a total of four electrophotographic process cartridges each having built therein the toner of one of the respective colors are removably mounted onto the main body of the electrophotographic image forming apparatus. In addition, the above-mentioned respective steps, that is, the charging, the exposure, the development, and the primary transfer are sequentially performed with a predetermined time difference therebetween to establish a state in which four color toner images for representing a full-color image are superimposed on the intermediate transfer belt 27.

The toner images on the intermediate transfer belt 27 are conveyed to a position facing a secondary transfer member 29 along with the rotation of the intermediate transfer belt 27. A recording sheet is conveyed to a space between the intermediate transfer belt 27 and the secondary transfer member 29 at a predetermined timing along a conveyance route 32 for the recording sheet, and the application of a secondary transfer bias to the secondary transfer member 29 leads to the transfer of the toner images on the intermediate transfer belt 27 onto the recording sheet. At this time, the bias voltage to be applied to the secondary transfer member 29 is +1,000 V or more and +4,000 V or less. The secondary transfer member 29 is also included in the transferring unit.

The recording sheet onto which the toner images have been transferred by the secondary transfer member 29 is conveyed to a fixing device 31 by the conveyance route 32 for the recording sheet. In the fixing device 31, the toner images on the recording sheet are melted to be fixed onto the recording sheet, and then the recording sheet is discharged to the outside of the electrophotographic image forming apparatus. Thus, a printing operation is completed.

The toner remaining on the image-bearing member 21 without being transferred from the image-bearing member 21 onto the intermediate transfer belt 27 is scraped off by the cleaning member 30 for cleaning the surface of the image-bearing member 21. Thus, the surface of the image-bearing member 21 is cleaned.

Although a configuration including the intermediate transfer belt has been described above as the transferring unit, the unit is not limited thereto, and may be a transferring unit of a direct transfer system that directly transfers the toner images from the image-bearing members onto the recording sheet.

According to one aspect of the present disclosure, the electrophotographic member, which can suppress harmful effects along with toner contamination and is hardly flawed even when printing is performed on many sheets, can be provided. In addition, according to another aspect of the present disclosure, the electrophotographic process cartridge and the electrophotographic image forming apparatus each including the electrophotographic member can be provided.

Examples

The present disclosure is specifically described below by way of Production Examples and Examples. However, the present disclosure is not limited thereto.

<Fine Particle>

[Fine Particle 1]

Crosslinked acrylic particles having an average particle diameter of 0.4 μm were synthesized by the same production method as that of Example 1 of Japanese Patent Application Laid-Open No. 2002-003511.

That is, 100 parts by weight of methyl methacrylate, 0.04 part by weight of ethylene glycol dimethacrylate, and 900 parts by weight of ion-exchanged water were loaded into a four-necked flask including a temperature gauge and a nitrogen-introducing tube, and having a volume of 1 liter, and the materials were mixed. Further, the temperature of the mixture was increased to 80° C. while the mixture was stirred in a stream of nitrogen.

Next, 0.2 part by weight of potassium persulfate was dissolved in 5 parts by weight of ion-exchanged water, and 5.2 parts by weight of the ion-exchanged water was added to the reaction liquid in the above-mentioned four-necked flask. While the temperature of the reaction liquid was held at 80° C., the reaction liquid was subjected to a reaction for 5.00 hours to provide a dispersion liquid of the crosslinked acrylic particles. The resultant crosslinked acrylic particles had a number-average particle diameter (or a volume-average particle diameter) of 0.40 μm. Herein, the number-average particle diameter is a value measured by the following method. The number-average particle diameter of the fine particle in this example is a value measured by the above-mentioned method.

The crosslinked acrylic particles thus obtained were adopted as fine particles 1.

[Fine Particle 2]

"MX-80H3wT" (product name, material: crosslinked acrylic, average particle diameter: 0.8 μm, manufactured by Soken Chemical & Engineering Co., Ltd.) was prepared as fine particle 2.

[Fine Particle 3]

Crosslinked acrylic particles having an average particle diameter of 0.9 μm were synthesized in the same manner as in the fine particles 1 except that the polymerization time was set to 11.25 hours. The resultant crosslinked acrylic particles were adopted as fine particle 3.

[Fine Particle 4]

Crosslinked acrylic particles having an average particle diameter of 0.1 μm were synthesized in the same manner as in the fine particles 1 except that the polymerization time was set to 1.25 hours. The fine particles thus obtained were adopted as fine particles 4.

[Fine Particle 5]

"EPOSTAR S6" (product name, material: melamine, average particle diameter: 0.4 μm, manufactured by Soken Chemical & Engineering Co., Ltd.) was prepared as fine particles 5.

[Fine Particle 6]

Crosslinked acrylic particles having an average particle diameter of 0.8 μm were synthesized in the same manner as in the fine particle 1 except that the polymerization time was set to 10.00 hours. The resultant crosslinked acrylic particles were adopted as fine particle 6.

[Fine Particle 7]

Crosslinked acrylic particles having an average particle diameter of 0.2 μm were synthesized in the same manner as in the fine particles 1 except that the polymerization time was set to 2.50 hours. The resultant crosslinked acrylic particles were adopted as fine particles 7.

[Fine Particle 8]

Crosslinked acrylic particles having an average particle diameter of 0.7 μm were synthesized in the same manner as in the fine particles 1 except that the polymerization time was set to 8.75 hours. The resultant crosslinked acrylic particles were adopted as fine particles 8.

[Fine Particle 9]

"SEAHOSTAR KE-S S50" (product name, material: silica, average particle diameter: 0.5 manufactured by Nippon Shokubai Co., Ltd.) was prepared as fine particles 9.

[Fine Particle 10]

"PT-301" (product name, material: titanium oxide, average particle diameter: 0.3 manufactured by Ishihara Sangyo Kaisha, Ltd.) was prepared as fine particles 10.

[Fine Particle 11]

Crosslinked acrylic particles having an average particle diameter of 1.0 μm were synthesized in the same manner as in the fine particles 1 except that the polymerization time was set to 12.50 hours. The resultant crosslinked acrylic particles were adopted as fine particles 11.

[Fine Particle 12]

"MP-1000" (product name, material: non-crosslinked acrylic resin, average particle diameter: 0.4 μm, manufactured by Soken Chemical & Engineering Co., Ltd.) was prepared as fine particle 12.

[Fine Particle 13]

Crosslinked acrylic particles having an average particle diameter of 0.04 μm were synthesized in the same manner as in the fine particles 1 except that the polymerization time was set to 0.50 hours. The resultant crosslinked acrylic particles were adopted as fine particle 13.

The material and number-average particle diameters (μm) of the fine particles 1 to 13 are collectively shown in Table 1. The number-average particle diameter of the respective fine particles No. 1 to 13 were calculated in accordance with the afore-mentioned calculation method.

TABLE 1

| Fine particle No. | Material | Number-Average particle diameter (μm) |
|---|---|---|
| 1 | Crosslinked acrylic particles | 0.4 |
| 2 | Crosslinked acrylic particles | 0.8 |
| 3 | Crosslinked acrylic particles | 0.9 |
| 4 | Crosslinked acrylic particles | 0.1 |
| 5 | Melamine particles | 0.4 |
| 6 | Crosslinked acrylic particles | 0.8 |
| 7 | Crosslinked acrylic particles | 0.2 |
| 8 | Crosslinked acrylic particles | 0.7 |
| 9 | Inorganic particles (silica) | 0.5 |
| 10 | Metal particles (titanium oxide) | 0.3 |
| 11 | Crosslinked acrylic particles | 1.0 |
| 12 | Non-crosslinked acrylic particles | 0.4 |
| 13 | Crosslinked acrylic particles | 0.04 |

<Synthesis of Resin Raw Material>

[Synthesis of Isocyanate Group-Terminated Prepolymer 1]

Under a nitrogen atmosphere, 100.0 parts by mass of a polytetramethylene glycol-based polyol (product name: PTMG 2000, manufactured by Hodogaya Chemical Co., Ltd.) was gradually dropped into 74.1 parts by mass of pure MDI (product name: MILLIONATE MT, manufactured by Tosoh Corporation) in a reaction vessel while a temperature in the reaction vessel was held at 65° C.

After the completion of the dropping, the mixture was subjected to a reaction at a temperature of 65° C. for 2 hours. The resultant reaction mixture was cooled to room temperature to provide an isocyanate group-terminated prepolymer 1 having an isocyanate group content of 5.1 mass %.

[Synthesis of Isocyanate Group-Terminated Prepolymer 2]

Under a nitrogen atmosphere, 100.0 parts by mass of a polyester/polycarbonate-based polyol (product name: NIPPOLAN 982, manufactured by Tosoh Corporation) was gradually dropped into 74.1 parts by mass of the above-mentioned pure MDI in a reaction vessel while a temperature in the reaction vessel was held at 65° C.

After the completion of the dropping, the mixture was subjected to a reaction at a temperature of 65° C. for 2 hours. The resultant reaction mixture was cooled to room temperature to provide an isocyanate group-terminated prepolymer 2 having an isocyanate group content of 4.9 mass %.

<Production of Elastic Roller>

A product obtained by applying a primer (product name: DY35-051, manufactured by Dow Corning Toray Co., Ltd.) to a cored bar made of SUS304 having an outer diameter of 6 mm and a length of 264 mm, and heating the primer at a temperature of 150° C. for 20 minutes was prepared as an electro-conductive substrate. The electro-conductive substrate 2 was arranged in a cylindrical mold having an inner diameter of 11.5 mm so as to be concentric therewith.

[Elastic Rollers Nos. 1 to 5]

The following materials serving as materials for an elastic layer were mixed at ratios shown in Table 2 with a kneading and stirring device (product name: TRIMIX TX-15; manufactured by Inoue Mfg., Inc.) to prepare an addition-curable liquid silicone rubber composition. The resultant addition-curable liquid silicone rubber composition was injected into the cavity of the mold heated to a temperature of 115° C. After the injection, the composition was heated at a temperature of 120° C. for 10 minutes, and was cooled to room temperature. After that, the substrate having formed therearound a cured silicone rubber layer was removed from the mold. Thus, elastic rollers Nos. 1 to 5 in each of which the elastic layer 3 having a thickness of 2.75 mm and containing the cured silicone was formed on the outer periphery of the electro-conductive substrate 2 were obtained.

TABLE 2

| | Elastic roller No. (part(s) by mass) | | | | |
|---|---|---|---|---|---|
| Material | 1 | 2 | 3 | 4 | 5 |
| Liquid dimethylpolysiloxane having two or more silicon atom-bonded alkenyl groups in a molecule thereof (product name: SF3000E, viscosity: 10 Pa · s, vinyl group equivalent: 0.05 mmol/g, manufactured by KCC Corporation) | 100 | 100 | 100 | 100 | 100 |
| Platinum-based catalyst (product name: SIP6832.2, manufactured by Gelest, Inc.) | 0.05 | 0.05 | 0.05 | 0.05 | 0.05 |
| Dimethylpolysiloxane having two or more silicon atom-bonded hydrogen atoms in a molecule thereof (product name: SP6000P, Si—H group equivalent: 15.5 mmol/g, manufactured by KCC Corporation) | 0.50 | 1.00 | 0.25 | 0.20 | 0.15 |
| Carbon black (product name: TOKABLACK #7360SB, manufactured by Tokai Carbon Co., Ltd.) | 6.0 | 6.0 | 6.0 | 6.0 | 6.0 |

[Elastic Roller No. 6]

Materials shown in "Components (1)" of Table 3 below were added at ratios shown in Table 3 to 100 parts by mass of a styrene-butadiene rubber (SBR) (product name: TUFDENE 2003, manufactured by Asahi Kasei Corporation), and the mixture was kneaded with a closed mixer regulated to a temperature of 80° C. for 15 minutes. Next, materials shown in "Components (2)" of Table 3 below were added at ratios shown in Table 3 to the kneaded product. Next, the mixture was kneaded with a twin roll machine cooled to a temperature of 25° C. for 10 minutes to provide an electro-conductive rubber composition No. 1.

TABLE 3

| | Material | Part(s) by mass |
|---|---|---|
| Components (1) | Styrene-butadiene rubber (SBR) (product name: TUFDENE 2003, manufactured by Asahi Kasei Corporation) | 100 |
| | Carbon black (product name: KETJENBLACK EC600JD, manufactured by Lion Corporation) | 8 |

TABLE 3-continued

| | Material | Part(s) by mass |
|---|---|---|
| Components (2) | Carbon black (product name: SEAST 5, manufactured by Tokai Carbon Co., Ltd.) | 40 |
| | Zinc oxide (product name: Zinc White Type 2, manufactured by Sakai Chemical Industry Co., Ltd.) | 5 |
| | Zinc stearate (product name: SZ-2000, manufactured by Sakai Chemical Industry Co., Ltd.) | 1 |
| | Calcium carbonate (product name: NANOX #30, manufactured by Maruo Calcium Co., Ltd.) | 15 |
| | Sulfur | 1 |
| | Tetrabenzylthiuram disulfide (product name: NOCCELER TBzTD, manufactured by Ouchi Shinko Chemical Industrial Co., Ltd.) | 1 |
| | Tetramethylthiuram monosulfide (product name: NOCCELER TS, manufactured by Ouchi Shinko Chemical Industrial Co., Ltd.) | 1 |

An electro-conductive vulcanized adhesive (product name: METALOC U-20, manufactured by Toyokagaku Kenkyusho Co., Ltd.) was applied and baked to the peripheral surface of a columnar body made of stainless steel (SUS304) having an outer diameter of 6 mm and a length of 270 mm to prepare an electro-conductive substrate.

The peripheral surface of the substrate serving as a central axis was coated with the electro-conductive rubber composition No. 1 in a cylindrical manner by using an extrusion molding device including a crosshead. The thickness of the layer of the electro-conductive rubber composition No. 1 used for the coating was set to 2.75 mm. The substrate whose peripheral surface had been coated with the layer of the electro-conductive rubber composition No. 1 was loaded into an air-heating furnace, and was heated at a temperature of 160° C. for 1 hour so that the layer of the electro-conductive rubber composition No. 1 was vulcanized. Thus, a rubber layer was formed. After that, both the end portions of the rubber layer were removed so that its length became 235 mm. Next, the outer peripheral surface of the rubber layer was polished with a polishing machine of a plunge cut grinding system so that the rubber layer was formed into a crown shape. The outer diameter of the crown-shaped rubber layer was measured with a laser length-measuring machine (product names: CONTROLLER LS-7000 and SENSOR HEAD LS-7030R, manufactured by Keyence Corporation) at a pitch of 1 mm in its longitudinal direction. Herein, a difference between an average outer diameter at a position distant toward the center of the rubber layer from an end portion in the longitudinal direction of the rubber layer by 10 mm and an average outer diameter at the center in the longitudinal direction was adopted as a crown amount. As a result, the average outer diameter at the position distant toward the center from the end portion in the longitudinal direction by 10 mm was 10.018 mm, and the average outer diameter at the center was 10.068 mm. Accordingly, the crown amount was 50 μm. After that, the substrate including the crown-shaped rubber layer was loaded into the air-heating furnace, and was subjected to post-heat treatment under an air atmosphere at a temperature of 195° C. for 1 hour to provide an elastic roller No. 6.

<Formation of Surface Layer>

[Coating Material Intermediates Nos. 1 to 9]

Coating material intermediates Nos. 1 to 9 serving as raw materials for coating materials for forming surface layers were prepared. That is, the following materials were stirred and mixed at ratios shown in Table 4. Next, methyl ethyl ketone (manufactured by Kishida Chemical Co., Ltd.) was added to each of the mixtures so that a solid content concentration became 30 mass %, followed by mixing. After that, the materials were uniformly dispersed with a sand mill.

Polyol

PTMG650: polytetramethylene glycol (molecular weight: 650, manufactured by Hodogaya Chemical Co., Ltd.)

PTMG1000: polytetramethylene glycol (molecular weight: 1,000, manufactured by Hodogaya Chemical Co., Ltd.)

PTMG2000: polytetramethylene glycol (molecular weight: 2,000, manufactured by Hodogaya Chemical Co., Ltd.)

PTMG3500: polytetramethylene glycol (molecular weight: 3,500, manufactured by Hodogaya Chemical Co., Ltd.)

NP-400: NEWPOL NP-400 (product name, manufactured by Sanyo Chemical Industries, Ltd.)

Isocyanate Compound

MR-400: Millionate MR-400 (product name, manufactured by Tosoh Corporation)

NCO1: the above-mentioned isocyanate group-terminated prepolymer 1

NCO2: the above-mentioned isocyanate group-terminated prepolymer 2

Carbon Black

SB X15: SUNBLACK X15 (product name, manufactured by Asahi Carbon Co., Ltd.)

Additive

TSF: TSF4445 (product name, polyether-modified silicone oil, manufactured by Momentive Performance Materials Japan LLC)

TABLE 4

| | Material | Coating material intermediate No. (part(s) by mass) | | | | | | | | |
|---|---|---|---|---|---|---|---|---|---|---|
| Kind | name | 1 | 2 | 3 | 4 | 5 | 6 | 7 | 8 | 9 |
| Polyol | PTMG650 | — | — | — | — | — | 71.4 | — | — | — |
| | PTMG1000 | 73.5 | 73.5 | 73.5 | — | — | — | — | — | — |
| | PTMG2000 | — | — | — | — | — | — | 75.8 | — | — |
| | PTMG3500 | — | — | — | — | 75.8 | — | — | — | 78.1 |
| | NP-400 | — | — | — | 6.5 | — | — | — | 6.5 | — |
| Isocyanate | MR-400 | 26.5 | 26.5 | 26.5 | — | 24.2 | 28.6 | 24.2 | — | 21.9 |
| | NCO1 | — | — | — | 93.5 | — | — | — | — | — |
| | NCO2 | — | — | — | — | — | — | — | 93.5 | — |
| Carbon black | SB X15 | 29.3 | 36.6 | 22 | 29.3 | 22 | 36.6 | 22 | 29.3 | 22 |
| Additive | TSF | 0.6 | 0.6 | 0.6 | 0 | 0.6 | 0.6 | 0.6 | 0 | 0.6 |

[Coating Material Intermediate No. 10]

Materials shown in Table 5 below were mixed and stirred. Next, methyl ethyl ketone (manufactured by Kishida Chemical Co., Ltd.) was added to the mixture so that a solid content concentration became 30 mass %, followed by mixing. After that, the materials were uniformly dispersed with a sand mill to provide a coating material intermediate No. 10.

TABLE 5

| Material | Part(s) by mass |
|---|---|
| DURANOL T-5652 (product name, manufactured by Asahi Kasei Corporation) | 39.9 |
| NEWPOL 50HB-660 (product name, manufactured by Sanyo Chemical Industries, Ltd.) | 2.1 |
| The above-mentioned isocyanate group-terminated prepolymer 2 | 58.0 |
| SUNBLACK X15 (product name, manufactured by Asahi Carbon Co., Ltd.) | 23.0 |
| TSF4445 (product name, manufactured by Momentive Performance Materials Japan LLC) | 1.0 |

[Coating Material Intermediate No. 11]

Materials shown in Table 6 below were mixed and stirred. Next, methyl ethyl ketone (manufactured by Kishida Chemical Co., Ltd.) was added to the mixture so that a solid content concentration became 30 mass %, followed by mixing. After that, the materials were uniformly dispersed with a sand mill to provide a coating material intermediate No. 11.

TABLE 6

| Material | Parts by mass |
|---|---|
| Acrylic polyol (product name: ACRYDIC A817, manufactured by DIC Corporation) | 75.0 |
| Melamine resin (product name: U-VAN 20SB, manufactured by Mitsui Chemicals, Inc.) | 25.0 |
| Carbon black (product name: Printex 25, manufactured by Orion Engineered Carbons) | 23.0 |

[Preparation of Coating Materials for forming Surface Layers]

The fine particles Nos. 1 to 13 were added to the resultant coating material intermediates Nos. 1 to 11. The combinations of the intermediates and the fine particles, and the numbers of parts of the fine particles are shown in Table 7 below. The materials were stirred and dispersed with a ball mill. The numbers of parts of the fine particles shown in Table 7 are each an amount with respect to 100 parts by mass of a binder resin in the corresponding coating material intermediate. The amount of the binder resin represents the total of the numbers of parts by mass of the polyol and isocyanate compound of the coating material intermediate. Next, methyl ethyl ketone (manufactured by Kishida Chemical Co., Ltd.) was added to the mixtures to adjust their solid contents to values shown in Table 7. Thus, coating materials Nos. 1 to 35 for forming surface layers were obtained.

TABLE 7

| Coating material No. for forming surface layer | Coating material intermediate No. | Fine particle No. | Number of parts of fine particle (parts by mass) | Solid content (%) |
|---|---|---|---|---|
| 1 | 1 | 1 | 90 | 5 |
| 2 | 1 | 1 | 95 | 5 |
| 3 | 1 | 1 | 70 | 5 |
| 4 | 2 | 1 | 90 | 5 |
| 5 | 3 | 1 | 90 | 5 |
| 6 | 1 | 2 | 90 | 10 |
| 7 | 1 | 3 | 90 | 10 |
| 8 | 1 | 4 | 90 | 10 |
| 9 | 1 | 2 | 99 | 10 |
| 10 | 1 | 2 | 95 | 10 |
| 11 | 1 | 2 | 70 | 10 |
| 12 | 1 | 2 | 60 | 10 |
| 13 | 1 | 5 | 90 | 10 |
| 14 | 1 | 6 | 90 | 10 |
| 15 | 4 | 2 | 90 | 10 |
| 16 | 5 | 2 | 90 | 10 |
| 17 | 1 | 7 | 90 | 3 |
| 18 | 1 | 8 | 90 | 8 |
| 19 | 1 | 2 | 90 | 12 |
| 20 | 2 | 2 | 90 | 10 |
| 21 | 3 | 2 | 90 | 10 |
| 22 | 6 | 2 | 90 | 10 |
| 23 | 7 | 2 | 90 | 10 |
| 24 | 1 | 9 | 90 | 10 |
| 25 | 1 | 10 | 90 | 10 |
| 26 | 1 | 2 | 90 | 15 |
| 27 | 1 | 11 | 90 | 10 |
| 28 | 1 | 2 | 100 | 10 |
| 29 | 1 | 2 | 55 | 10 |
| 30 | 1 | 12 | 90 | 10 |
| 31 | 8 | 2 | 90 | 10 |
| 32 | 9 | 2 | 90 | 10 |
| 33 | 1 | 13 | 90 | 10 |
| 34 | 10 | 2 | 90 | 10 |
| 35 | 11 | 2 | 90 | 10 |

[Developing Roller No. 1]

The coating material No. 1 for forming a surface layer was applied to the above-mentioned elastic roller No. 1 by roll coating so that the dry thickness of its coating film became 0.4 μm. After that, the coating film was heated at a temperature of 130° C. for 60 minutes to be dried and cured, to thereby form a surface layer on the elastic layer of the roller. Thus, a developing roller No. 1 was produced.

[Developing Rollers Nos. 2 to 50]

Coating materials for forming surface layers were each prepared in the same manner as that described above except that materials shown in Table 7 were used as materials for a surface layer. Then, the respective coating materials were applied to the respective elastic rollers as shown in Table 8, and were dried and heated in the same manner as that described above. Thus, developing rollers Nos. 2 to 50 were produced.

TABLE 8

| Developing roller No. | Coating material No. for forming surface layer | Elastic roller No. |
|---|---|---|
| 1 | 1 | 1 |
| 2 | 2 | 1 |
| 3 | 3 | 1 |
| 4 | 1 | 2 |
| 5 | 1 | 3 |
| 6 | 4 | 1 |
| 7 | 5 | 1 |
| 8 | 6 | 1 |
| 9 | 7 | 1 |
| 10 | 8 | 1 |
| 11 | 9 | 1 |

TABLE 8-continued

| Developing roller No. | Coating material No. for forming surface layer | Elastic roller No. |
|---|---|---|
| 12 | 10 | 1 |
| 13 | 11 | 1 |
| 14 | 12 | 1 |
| 15 | 13 | 1 |
| 16 | 14 | 1 |
| 17 | 15 | 1 |
| 18 | 16 | 1 |
| 19 | 17 | 1 |
| 20 | 18 | 1 |
| 21 | 19 | 1 |
| 22 | 9 | 2 |
| 23 | 10 | 2 |
| 24 | 6 | 2 |
| 25 | 11 | 2 |
| 26 | 12 | 2 |
| 27 | 9 | 3 |
| 28 | 10 | 3 |
| 29 | 6 | 3 |
| 30 | 11 | 3 |
| 31 | 12 | 3 |
| 32 | 20 | 1 |
| 33 | 21 | 1 |
| 34 | 22 | 1 |
| 35 | 23 | 1 |
| 36 | 24 | 1 |
| 37 | 25 | 1 |
| 38 | 26 | 1 |
| 39 | 27 | 1 |
| 40 | 28 | 1 |
| 41 | 29 | 1 |
| 42 | 30 | 1 |
| 43 | 31 | 1 |
| 44 | 32 | 1 |
| 45 | 6 | 6 |
| 46 | 6 | 4 |
| 47 | 6 | 5 |
| 48 | 33 | 1 |
| 49 | 34 | 1 |
| 50 | 35 | 1 |

<Evaluations of Physical Properties of Developing Members>

The resultant developing rollers were subjected to the following measurements and physical property evaluations. The results are shown in Table 9-1.

[Thickness Measurement]

The thickness of the surface layer of each of the developing rollers was measured as described below. Sections at a total of 9 sites determined as follows were observed with an optical microscope or an electron microscope, and their thicknesses were measured: 3 sites in the axial direction of the surface layer and 3 sites in the circumferential direction thereof. The average of the measured values was adopted as the "thickness" of the surface layer.

[Measurement of Elastic Modulus E1 of Fine Particle in Surface Layer and Elastic Modulus E2 of Binder Resin Therein]

The elastic modulus E1 of the fine particle in the surface layer and the elastic modulus E2 of the binder resin therein were determined by the above-mentioned method of measuring an elastic modulus with a SPM.

[Measurement of Elastic Moduli E1 and E2]

The elastic modulus E1 of the fine particle in the surface layer and the elastic modulus E2 of the binder resin therein were measured as described below. Such a sample that a section corresponding to the entire thickness of the surface layer was exposed was produced from the surface layer. The sample was formed into a cube shape 100 μm on a side. Then, the probe of a scanning probe microscope (SPM) was brought into contact with a fine particle portion and a binder resin portion exposed to the surface of the resultant sample to which the entire thickness-direction section of the surface layer was exposed to measure force curves. The elastic moduli E1 and E2 were determined from the resultant force curves based on Hertz's theory. "MFP-3D-Origin" (product name, manufactured by Oxford Instruments) was used as the SPM. According to the device, the measurement of the force curves is automatically performed, and the elastic moduli E1 and E2 are automatically output from the measured force curves.

Herein, the sample was produced from the surface layer as follows: the cube-shaped sample 100 μm on a side was produced from the surface layer with a frozen cutting system (product name: EM FC6, manufactured by Leica Microsystems) and an ultramicrotome (product name: EM UC6, manufactured by Leica Microsystems). The sample was collected from a central portion in the longitudinal direction of the surface layer. The measurement was performed in the fine particle portion and the binder resin portion exposed to the region of the surface (observation surface) of the resultant sample corresponding to the entire thickness-direction section of the surface layer ranging from T/3 to 2T/3 in a depth direction from the outer surface side of the surface layer, that is, a central region when the observation surface was divided into three equal parts in its thickness direction.

In this measurement, a value determined as follows was adopted as the elastic modulus E1: force curves were measured with the SPM at 10 arbitrary sites of the fine particle portion exposed to the observation surface, and elastic moduli were calculated from the force curves; and the arithmetic average of 8 values out of the calculated elastic moduli except the maximum and the minimum was adopted as the E1.

In addition, in this measurement, a value determined as follows was adopted as the elastic modulus E2: force curves were measured with the SPM at 10 arbitrary sites of the binder resin portion exposed to the observation surface, and elastic moduli were calculated from the force curves; and the arithmetic average of 8 values out of the calculated elastic moduli except the maximum and the minimum was adopted as the E2.

With regard to the measurement of the force curves, the mode of the SPM for the measurement of the force curves was set to a contact mode, and the Force Distance and Trigger Point thereof were set to 500 nm and 0.01 V, respectively. In addition, a silicon cantilever for a dynamic mode such as "OMCL-AC-160TS" (product name, manufactured by Olympus Corporation, spring constant=47.08 N/m) was used as a cantilever, and its scanning frequency was set to 1 Hz.

[Measurement of Volume Occupancy of Fine Particle with Respect to Binder Resin in Surface Layer]

The volume occupancy of the fine particles in the surface layer was calculated in accordance with the afore-mentioned calculation method.

[Measurement of MD-1 Hardness]

An electrophotographic roller serving as a measurement object was left to stand under an environment at a temperature of 23° C. and a relative humidity of 53% for 24 hours. Next, an MD-1 hardness at each of 12 positions determined as follows was measured with a microrubber hardness meter (product name: MD-1capa, manufactured by Kobunshi Keiki Co., Ltd.) and a type C indenter (diameter: 1.00 mm) by indenting the roller by 2 mm: the central portion of the surface layer of the electrophotographic roller and positions distant inward from both the end portions thereof by 20 mm each were determined, and four points were determined in each of the three portions in increments of 90° in the circumferential direction thereof. The average of the MD-1 hardnesses at the respective positions was adopted as the MD-1 hardness H1 of the surface layer in this measurement.

Next, the surface layer was removed from the electrophotographic roller serving as a measurement object with an ultramicrotome (product name: EM UC6, manufactured by Leica Microsystems) to expose the surface of the elastic layer of the roller. Then, the MD-1 hardness H2 of the elastic layer was obtained in the same manner as that described above except that the site with which the indenter of the microrubber hardness meter was brought into contact was set to the exposed surface of the elastic layer.

Then, a difference (H1−H2) between the hardness H1 of the surface layer and the hardness H2 of the elastic layer thus obtained was calculated.

[Measurement of Tensile Modulus]

A tensile modulus was measured by using a test piece produced from each of the coating materials Nos. 1 to 35 for forming surface layers under the following conditions. The number "n" of times of the measurement was set to 5, and the measurement was performed with a universal tensile tester (product name: TENSILON RTC-1250A, manufactured by ORIENTEC) in a measurement environment at a temperature of 20° C. and a humidity of 60% RH. The average of the measured values was adopted as the tensile modulus.

<Image Evaluations>

The following image evaluations were performed. The results are shown in Table 9-1 and Table 9-2.

[Preparation of Image Evaluations]

A cyan process cartridge (product name: HP 656X High Yield Cyan Original LaserJet Toner Cartridge, manufactured by Hewlett-Packard Company) for a color laser printer (product name: HP Color LaserJet Enterprise M652dn, manufactured by Hewlett-Packard Company) was prepared, and the developing rollers Nos. 1 to 50 each of which was in a state in which its surface was coated with toner were each stored in the individual cartridge (CRG) for performing an initial sticking evaluation. Subsequently, those CRGs were left to stand under a high-temperature and high-humidity environment at a temperature of 30° C. and a relative humidity of 95% for 30 days.

[Evaluation 1: Initial Sticking Evaluation]

Under a temperature of 30° C. and a relative humidity of 95%, the CRGs storing the developing rollers Nos. 1 to 50 were each stored in the main body of the color laser printer. Subsequently, a solid white image was output on 50 sheets without preliminary rotation of the CRG. When an image harmful effect due to an abnormal image started to occur from the first sheet, the number of sheets required for the disappearance of the harmful effect was recorded. When no abnormal image was observed, the number was regarded as 0 sheets.

[Evaluation 2: Evaluation of Melt-Adhesion Product on Blade]

The CRG was removed from the main body, and its developing roller and regulating blade were removed. After that, the surface of the regulating blade was observed with a laser microscope (product name: VK-8700, manufactured by Keyence Corporation) and an objective lens having a magnification of 20, and the size of its toner melt-adhesion product was measured. When no melt-adhesion product was present, the size was regarded as 0.

[Evaluation 3: Surface Flaw Evaluation]

Air was blown onto the surface of the developing roller removed from the CRG to remove the toner with which the surface was coated. Subsequently, the surface state of the roller was observed with a laser microscope (product name: VK-8700, manufactured by Keyence Corporation) and an objective lens having a magnification of 20, and the size of a flaw on the surface was measured. When no surface flaw was present, the size was regarded as 0.

[Evaluation 4: Filming Evaluation]

The surface of the above-mentioned developing roller was observed with a laser microscope (product name: VK-8700, manufactured by Keyence Corporation) and an objective lens having a magnification of 20, and the area ratio of filming was calculated. When no filming was present, the area ratio was regarded as 0.

TABLE 9-1

| | | | | Average particle diameter | Volume occupancy | SPM elastic modulus (MPa) | | MD-1 hardness | | | 10% modulus of |
|---|---|---|---|---|---|---|---|---|---|---|---|
| Example | Comparative Example | Developing roller No. | Thickness of surface layer (μm) | of fine particle (μm) | of fine particle (vol %) | Fine particle (E1) | Binder resin (E2) | Surface layer (H1) | Elastic layer (H2) | H1 − H2 | binder resin (MPa) |
| 1 | — | 1 | 0.4 | 0.4 | 90 | 1,500 | 25 | 72 | 65 | 7 | 10 |
| 2 | — | 2 | 0.4 | 0.4 | 95 | 1,500 | 25 | 74 | 65 | 9 | 10 |
| 3 | — | 3 | 0.4 | 0.4 | 70 | 1,500 | 25 | 70 | 65 | 5 | 10 |
| 4 | — | 4 | 0.4 | 0.4 | 90 | 1,500 | 25 | 95 | 90 | 5 | 10 |
| 5 | — | 5 | 0.4 | 0.4 | 90 | 1,500 | 25 | 50 | 45 | 5 | 10 |
| 6 | — | 6 | 0.4 | 0.4 | 90 | 1,500 | 25 | 70 | 65 | 5 | 20 |
| 7 | — | 7 | 0.4 | 0.4 | 90 | 1,500 | 25 | 70 | 65 | 5 | 2 |
| 8 | — | 8 | 0.8 | 0.8 | 90 | 1,500 | 25 | 72 | 65 | 7 | 10 |
| 9 | — | 9 | 0.8 | 0.9 | 90 | 1,500 | 25 | 72 | 65 | 7 | 10 |
| 10 | — | 10 | 0.8 | 0.1 | 90 | 1,500 | 25 | 72 | 65 | 7 | 10 |
| 11 | — | 11 | 0.8 | 0.8 | 99 | 1,500 | 25 | 75 | 65 | 10 | 5 |
| 12 | — | 12 | 0.8 | 0.8 | 95 | 1,500 | 25 | 74 | 65 | 9 | 7 |
| 13 | — | 13 | 0.8 | 0.8 | 70 | 1,500 | 25 | 71 | 65 | 6 | 10 |
| 14 | — | 14 | 0.8 | 0.8 | 60 | 1,500 | 25 | 70 | 65 | 5 | 10 |
| 15 | — | 15 | 0.4 | 0.4 | 90 | 3,000 | 25 | 75 | 65 | 10 | 10 |
| 16 | — | 16 | 0.8 | 0.8 | 90 | 1,000 | 25 | 75 | 65 | 10 | 10 |
| 17 | — | 17 | 0.8 | 0.8 | 90 | 1,500 | 200 | 80 | 65 | 15 | 20 |
| 18 | — | 18 | 0.8 | 0.8 | 90 | 1,500 | 2 | 70 | 65 | 5 | 6 |
| 19 | — | 19 | 0.2 | 0.2 | 90 | 1,500 | 25 | 70 | 65 | 5 | 10 |
| 20 | — | 20 | 0.7 | 0.7 | 90 | 1,500 | 25 | 71 | 65 | 6 | 10 |

TABLE 9-1-continued

| Example | Comparative Example | Developing roller No. | Thickness of surface layer (μm) | Average particle diameter of fine particle (μm) | Volume occupancy of fine particle (vol %) | SPM elastic modulus (MPa) Fine particle (E1) | SPM elastic modulus (MPa) Binder resin (E2) | MD-1 hardness Surface layer (H1) | MD-1 hardness Elastic layer (H2) | MD-1 hardness H1 − H2 | 10% modulus of binder resin (MPa) |
|---|---|---|---|---|---|---|---|---|---|---|---|
| 21 | — | 21 | 0.9 | 0.8 | 90 | 1,500 | 25 | 74 | 65 | 9 | 10 |
| 22 | — | 22 | 0.8 | 0.8 | 99 | 1,500 | 25 | 100 | 90 | 10 | 10 |
| 23 | — | 23 | 0.8 | 0.8 | 95 | 1,500 | 25 | 98 | 90 | 8 | 10 |
| 24 | — | 24 | 0.8 | 0.8 | 90 | 1,500 | 25 | 97 | 90 | 7 | 10 |
| 25 | — | 25 | 0.8 | 0.8 | 70 | 1,500 | 25 | 96 | 90 | 6 | 10 |
| 26 | — | 26 | 0.8 | 0.8 | 60 | 1,500 | 25 | 95 | 90 | 5 | 10 |
| 27 | — | 27 | 0.8 | 0.8 | 99 | 1,500 | 25 | 59 | 45 | 14 | 10 |
| 28 | — | 28 | 0.8 | 0.8 | 95 | 1,500 | 25 | 57 | 45 | 12 | 10 |
| 29 | — | 29 | 0.8 | 0.8 | 90 | 1,500 | 25 | 56 | 45 | 11 | 10 |
| 30 | — | 30 | 0.8 | 0.8 | 70 | 1,500 | 25 | 54 | 45 | 9 | 10 |
| 31 | — | 31 | 0.8 | 0.8 | 60 | 1,500 | 25 | 53 | 45 | 8 | 10 |
| 32 | — | 32 | 0.8 | 0.8 | 90 | 1,500 | 25 | 77 | 65 | 12 | 20 |
| 33 | — | 33 | 0.8 | 0.8 | 90 | 1,500 | 25 | 71 | 65 | 6 | 2 |
| 34 | — | 34 | 0.8 | 0.8 | 90 | 1,500 | 30 | 79 | 65 | 14 | 25 |
| 35 | — | 35 | 0.8 | 0.8 | 90 | 1,500 | 20 | 70 | 65 | 5 | 1 |
| 36 | — | 36 | 0.8 | 0.5 | 90 | 5,000 | 25 | 80 | 65 | 15 | 11 |
| 37 | — | 37 | 0.8 | 0.3 | 90 | 4,500 | 25 | 80 | 65 | 15 | 11 |
| 38 | — | 49 | 0.8 | 0.8 | 90 | 1,500 | 24 | 75 | 65 | 10 | 10 |
| 39 | — | 50 | 0.8 | 0.8 | 90 | 1,500 | 200 | 80 | 65 | 15 | 20 |
| — | 1 | 38 | 1.5 | 0.8 | 90 | 1,500 | 25 | 75 | 65 | 10 | 10 |
| — | 2 | 39 | 0.8 | 1.0 | 90 | 1,500 | 25 | 76 | 65 | 11 | 11 |
| — | 3 | 40 | 0.8 | 0.8 | 100 | 1,500 | 25 | 85 | 65 | 20 | 2 |
| — | 4 | 41 | 0.8 | 0.8 | 55 | 1,500 | 25 | 75 | 65 | 10 | 10 |
| — | 5 | 42 | 0.4 | 0.4 | 90 | 750 | 25 | 75 | 65 | 10 | 10 |
| — | 6 | 43 | 0.8 | 0.8 | 90 | 1,500 | 300 | 75 | 65 | 10 | 29 |
| — | 7 | 44 | 0.8 | 0.8 | 90 | 1,500 | 0.5 | 70 | 65 | 5 | 1 |
| — | 8 | 45 | 0.8 | 0.8 | 90 | 1,500 | 25 | 150 | 140 | 10 | 10 |
| — | 9 | 46 | 0.8 | 0.8 | 90 | 1,500 | 25 | 40 | 35 | 5 | 10 |
| — | 10 | 47 | 0.8 | 0.8 | 90 | 1,500 | 25 | 50 | 48 | 2 | 10 |
| — | 11 | 48 | 0.8 | 0.04 | 90 | 1,500 | 25 | 75 | 65 | 10 | 10 |

TABLE 9-2

| Example | Comparative Example | Evaluation 1 Initial sticking (sheet(s)) | Evaluation 2 Melt-adhesion product on blade (μm) | Evaluation 3 Surface flaw (μm) | Evaluation 4 Filming (%) |
|---|---|---|---|---|---|
| 1 | — | 0 | 0 | 0 | 0 |
| 2 | — | 0 | 0 | 1 | 0 |
| 3 | — | 1 | 0.1 | 0 | 0 |
| 4 | — | 0 | 0 | 0 | 3 |
| 5 | — | 2 | 0 | 0 | 0 |
| 6 | — | 0 | 0 | 4 | 4 |
| 7 | — | 2 | 0 | 0 | 2 |
| 8 | — | 0 | 0.3 | 3 | 2 |
| 9 | — | 0 | 0.2 | 2 | 4 |
| 10 | — | 0 | 4 | 2 | 1 |
| 11 | — | 2 | 0 | 8 | 8 |
| 12 | — | 0 | 0.2 | 4 | 4 |
| 13 | — | 2 | 0.7 | 1 | 2 |
| 14 | — | 3 | 2 | 0 | 1 |
| 15 | — | 0 | 0 | 3 | 4 |
| 16 | — | 0 | 4 | 1 | 0 |
| 17 | — | 0 | 0.2 | 10 | 10 |
| 18 | — | 10 | 0.2 | 5 | 6 |
| 19 | — | 4 | 0 | 0 | 0 |
| 20 | — | 0 | 0.2 | 2 | 1 |
| 21 | — | 0 | 0.4 | 4 | 8 |
| 22 | — | 0 | 0 | 9 | 10 |
| 23 | — | 0 | 0.2 | 6 | 9 |
| 24 | — | 0 | 0.3 | 3 | 7 |
| 25 | — | 2 | 0.7 | 2 | 6 |
| 26 | — | 3 | 4 | 1 | 5 |
| 27 | — | 4 | 0 | 5 | 3 |
| 28 | — | 5 | 0.3 | 3 | 1 |
| 29 | — | 6 | 0.4 | 2 | 0 |
| 30 | — | 8 | 4 | 1 | 0 |
| 31 | — | 10 | 2 | 0 | 0 |

TABLE 9-2-continued

| Example | Comparative Example | Evaluation 1 Initial sticking (sheet(s)) | Evaluation 2 Melt-adhesion product on blade (μm) | Evaluation 3 Surface flaw (μm) | Evaluation 4 Filming (%) |
|---|---|---|---|---|---|
| 32 | — | 0 | 0.2 | 8 | 8 |
| 33 | — | 11 | 0.2 | 0 | 0 |
| 34 | — | 0 | 0.2 | 9 | 9 |
| 35 | — | 12 | 0.2 | 2 | 3 |
| 36 | — | 0 | 0 | 3 | 11 |
| 37 | — | 0 | 0 | 3 | 10 |
| 38 | — | 0 | 0.2 | 3 | 2 |
| 39 | — | 0 | 0.4 | 10 | 10 |
| — | 1 | 3 | 0.4 | 4 | 20 |
| — | 2 | 2 | 0.3 | 3 | 20 |
| — | 3 | 2 | 0 | 20 | 14 |
| — | 4 | 7 | 15 | 3 | 4 |
| — | 5 | 3 | 16 | 2 | 0 |
| — | 6 | 4 | 0.3 | 22 | 21 |
| — | 7 | 23 | 0.3 | 3 | 1 |
| — | 8 | 2 | 0.3 | 3 | 25 |
| — | 9 | 20 | 0.2 | 2 | 18 |
| — | 10 | 11 | 7 | 2 | 23 |
| — | 11 | 5 | 17 | 2 | 2 |

[Discussion of Evaluation Results]

In each of Examples 1 to 39, each of the conditions fell within the range described in the present disclosure, and hence no problem occurred in terms of each of the initial sticking, an image density, the melt adhesion of the toner to the blade, a surface flaw, and the filming. Accordingly, it was recognized that those developing rollers were each able to exhibit satisfactory image performance.

In particular, in each of Examples 1 to 7, 15, and 19, the evaluation results are those of the sample in which the thickness of the surface layer is as small as 0.5 μm or less, and hence substantially no melt adhesion of the toner to the blade is observed. This is assumed to be because the melt-adhesion product on the blade is satisfactorily scraped off by the developing roller.

In addition, the following tendency was observed: as the 10% modulus of the binder resin of the surface layer became smaller, the surface of the layer was more hardly flawed.

Meanwhile, in each of Comparative Examples 1, 2, 6, and 8, the filming was remarkably observed. This is assumed to be because the thickness of the surface layer, the average particle diameter of the fine particle, the elastic modulus of the binder resin, or the hardness of the surface layer deviated from the range of the present disclosure, and hence a stress to the toner became remarkable.

In Comparative Example 3, a surface flaw was remarkably observed. This is assumed to be because the volume occupancy of the fine particle was large, and hence the surface layer embrittled.

In each of Comparative Examples 4, 5, 10, and 11, the image density was low, and the melt-adhesion product on the blade was remarkably observed. This is assumed to be because in each of the comparative examples, the volume occupancy of the fine particle was less than the specification of the present disclosure, the elastic modulus of the fine particle was less than the specification thereof, the difference in MD-1 hardness between the surface layer and the elastic layer was less than the specification thereof, or the average particle diameter of the fine particle was less than the specification thereof, and hence the toner component that had melt-adhered to the blade could not be satisfactorily scraped off.

In each of Comparative Examples 7 and 9, the initial sticking was remarkably observed. This is assumed to be due to an influence caused by the fact that in each of the comparative examples, the elastic modulus of the binder resin is less than the specification of the present disclosure, or the MD-1 of the surface layer is less than the specification thereof, and hence the molecular mobility of the resin on the outermost surface of the developing roller is high, or a nip when the roller is brought into abutment with an image-bearing member becomes larger.

The present disclosure encompasses the following configurations.

[Configuration 1]

An electrophotographic member including: an electro-conductive substrate; an elastic layer formed on the substrate; and a surface layer formed on the elastic layer, wherein the surface layer contains a fine particle and a binder resin, wherein the surface layer has a thickness of less than 1.0 μm, wherein the fine particle have an average particle diameter of from 0.1 μm to 0.9 μm, wherein the fine particle have a volume occupancy of 60 vol % or more and 99 vol % or less with respect to 100 vol % of the binder resin in the surface layer, wherein when an elastic modulus of the fine particles and an elastic modulus of the binder resin, which are elastic moduli calculated by Hertz's theory through measurement of force curves with a probe of a SPM device in a thickness-direction section of the surface layer, are represented by E1 and E2, respectively, the E1 and the E2 satisfy relationships represented by the following formulae (1) and (2):

$$E1 \geq 1{,}000 \text{ MPa} \quad (1)$$

$$200 \text{ MPa} \geq E2 \geq 2 \text{ MPa} \quad (2),$$

and wherein when an MD-1 hardness, which is measured by bringing a type C indenter into contact with a surface opposite to a surface on a side of the surface layer of the electrophotographic member facing the elastic layer at an indentation depth of 2 mm, is represented by H1, and an MD-1 hardness, which is measured by peeling the surface layer from the electrophotographic member to expose a surface of the elastic layer, and bringing the type C indenter into contact with the exposed surface of the elastic layer at an indentation depth of 2 mm, is represented by H2, the H1 and the H2 satisfy relationships represented by the following formulae (3) and (4).

$$100° \geq H1 \geq 50° \quad (3)$$

$$H1-H2 \geq 5° \quad (4)$$

[Configuration 2]

The electrophotographic member according to Configuration 1, wherein the binder resin has a 10% modulus value of 2 MPa or more and 20 MPa or less.

[Configuration 3]

The electrophotographic member according to Configuration 1 or 2, wherein the surface layer has a thickness of 0.5 μm or less.

[Configuration 4]

An electrophotographic process cartridge removably mounted onto a main body of an electrophotographic image forming apparatus, the electrophotographic process cartridge including the electrophotographic member of any one of Configurations 1 to 3.

[Configuration 5]

An electrophotographic image forming apparatus including: an image-bearing member for bearing an electrostatic latent image; a charging device for primarily charging the image-bearing member; an exposing device for forming an electrostatic latent image on the image-bearing member that is primarily charged; a developing member for developing the electrostatic latent image with toner to form a toner image; and a transferring device for transferring the toner image onto a transfer member, wherein the developing member is the electrophotographic member of any one of Configurations 1 to 3.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-084553, filed May 24, 2022, and Japanese Patent Application No. 2023-077930, filed May 10, 2023, which are hereby incorporated by reference herein in their entirety.

What is claimed is:

1. An electrophotographic member comprising:

an electro-conductive substrate;

an elastic layer on the electro-conductive substrate; and a surface layer on the elastic layer, the surface layer containing a fine particle and a binder resin, the surface layer having a thickness of less than 1.0 μm, the fine particle having an average particle diameter of from 0.1 μm to 0.9 μm, the fine particle having a volume occupancy of 60 vol % to 99 vol % with respect to 100 vol % of the binder resin in the surface layer, wherein E1 and E2 satisfy relationships represented by the following formulae (1) and (2):

$$E1 \geq 1{,}000 \text{ MPa} \quad (1)$$

$$200 \text{ MPa} \geq E2 \geq 2 \text{ MPa} \quad (2),$$

where E1 denotes an elastic modulus of the fine particle and E2 denotes an elastic modulus of the binder resin, E1 and E2 being obtained by measurement of force curves with a SPM in a cross-section of a thickness-direction of the surface layer, and wherein H1 and H2 satisfy relationships represented by the following formulae (3) and (4):

$$100° \geq H1 \geq 50° \quad (3)$$

$$H1-H2 \geq 5° \quad (4)$$

where H1 denotes an MD-1 hardness, which is measured by bringing a type C indenter into contact with a surface of the surface layer, the surface being opposite to a surface facing the elastic layer, at an indentation depth of 2 mm, and H2 denotes an MD-1 hardness, which is measured by peeling the surface layer from the electrophotographic member to expose a surface of the elastic layer, and bringing the type C indenter into contact with the exposed surface of the elastic layer at an indentation depth of 2 mm.

2. The electrophotographic member according to claim 1, wherein the binder resin has a 10% modulus value of 2 MPa to 20 MPa.

3. The electrophotographic member according to claim 1, wherein the surface layer has a thickness of 0.5 μm or less.

4. An electrophotographic process cartridge removably mountable to a main body of an electrophotographic image forming apparatus, the electrophotographic process cartridge comprising an electrophotographic member, wherein the electrophotographic member includes an electro-conductive substrate, an elastic layer on the substrate, and a surface layer on the elastic layer, the surface layer contains a fine particle and a binder resin, the surface layer has a thickness of less than 1.0 μm, the fine particle has an average particle diameter of from 0.1 μm to 0.9 μm, the fine particle has a volume occupancy of 60 vol % to 99 vol % with respect to 100 vol % of the binder resin in the surface layer, wherein E1 and E2 satisfy relationships represented by the following formulae (1) and (2):

$$E1 \geq 1{,}000 \text{ MPa} \quad (1)$$

$$200 \text{ MPa} \geq E2 \geq 2 \text{ MPa} \quad (2),$$

where E1 denotes an elastic modulus of the fine particle and E2 denotes an elastic modulus of the binder resin, E1 and E2 being obtained by measurement of force curves with a SPM in a cross-section of a thickness-direction of the surface layer, and wherein H1 and H2 satisfy relationships represented by the following formulae (3) and (4):

$$100° \geq H1 \geq 50° \quad (3)$$

$$H1-H2 \geq 5° \quad (4)$$

where H1 denotes an MD-1 hardness, which is measured by bringing a type C indenter into contact with a surface of the surface layer, the surface being opposite to a surface facing the elastic layer, at an indentation depth of 2 mm, and H2 denotes an MD-1 hardness, which is measured by peeling the surface layer from the electrophotographic member to expose a surface of the elastic layer, and bringing the type C indenter into contact with the exposed surface of the elastic layer at an indentation depth of 2 mm.

5. An electrophotographic image forming apparatus comprising:

an image-bearing member for bearing an electrostatic latent image;

a charging device for primarily charging the image-bearing member;

an exposing device for forming an electrostatic latent image on the image-bearing member that is primarily charged;

a developing member for developing the electrostatic latent image with toner to form a toner image; and a transferring device for transferring the toner image onto a transfer member, wherein the developing member is an electrophotographic member, the electrophotographic member includes an electro-conductive substrate, an elastic layer on the substrate, and a surface layer on the elastic layer, the surface layer contains a fine particle and a binder resin, the surface layer has a thickness of less than 1.0 μm, the fine particle has an average particle diameter of from 0.1 μm to 0.9 μm, the fine particle has a volume occupancy of 60 vol % to 99 vol % with respect to 100 vol % of the binder resin in the surface layer, wherein E1 and E2 satisfy relationships represented by the following formulae (1) and (2):

$$E1 \geq 1{,}000\ \text{MPa} \quad (1)$$

$$200\ \text{MPa} \geq E2 \geq 2\ \text{MPa} \quad (2),$$

where E1 denotes an elastic modulus of the fine particle and E2 denotes an elastic modulus of the binder resin, E1 and E2 being obtained by measurement of force curves with a SPM in a cross-section of a thickness-direction of the surface layer, and wherein H1 and H2 satisfy relationships represented by the following formulae (3) and (4):

$$100° \geq H1 \geq 50° \quad (3)$$

$$H1 - H2 \geq 5° \quad (4)$$

where H1 denotes an MD-1 hardness, which is measured by bringing a type C indenter into contact with a surface of the surface layer, the surface being opposite to a surface facing the elastic layer, at an indentation depth of 2 mm, and H2 denotes an MD-1 hardness, which is measured by peeling the surface layer from the electrophotographic member to expose a surface of the elastic layer, and bringing the type C indenter into contact with the exposed surface of the elastic layer at an indentation depth of 2 mm.

* * * * *